United States Patent
Nomura

(10) Patent No.: US 7,493,784 B2
(45) Date of Patent: Feb. 24, 2009

(54) WASHING MACHINE WITH WATER TREATMENT UNIT

(75) Inventor: Hiroyuki Nomura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 517 days.

(21) Appl. No.: 10/553,894

(22) PCT Filed: Aug. 5, 2004

(86) PCT No.: PCT/JP2004/011257

§ 371 (c)(1),
(2), (4) Date: Oct. 21, 2005

(87) PCT Pub. No.: WO2005/044737

PCT Pub. Date: May 19, 2005

(65) Prior Publication Data

US 2006/0213236 A1   Sep. 28, 2006

(30) Foreign Application Priority Data

Nov. 10, 2003   (JP) .............................. 2003-380329

(51) Int. Cl.
*D06F 35/00* (2006.01)
*D06F 29/00* (2006.01)
(52) U.S. Cl. ....................................... 68/13 A; 68/23.5
(58) Field of Classification Search ................. 68/17 R, 68/23 R, 23.5, 13 A
See application file for complete search history.

(56) References Cited

U.S. PATENT DOCUMENTS 4,434,629 A * 3/1984 Bianchi et al. .............. 68/13 A 7,296,444 B2 * 11/2007 Mae et al. ................... 68/12.04
2004/0144136 A1 * 7/2004 Mae et al. ................... 68/12.19
2004/0172985 A1 * 9/2004 Mamiya et al. ............. 68/12.05
2006/0185403 A1 * 8/2006 Ikemizu et al. ............. 68/12.18

FOREIGN PATENT DOCUMENTS

| JP | 2-191588 | | 7/1990 |
|---|---|---|---|
| JP | 05068783 A | * | 3/1993 |
| JP | 2661632 | | 6/1997 |
| JP | 2001-276484 | | 10/2001 |
| JP | 2003-000991 | | 1/2003 |
| JP | 2003-024692 | | 1/2003 |
| JP | 2003-290594 | | 10/2003 |
| JP | 2004057423 A | * | 2/2004 |

OTHER PUBLICATIONS

International Search Report for corresponding PCT/JP2004/011257, mailed Oct. 12, 2004.

* cited by examiner

*Primary Examiner*—Joseph L Perrin
(74) *Attorney, Agent, or Firm*—Renner, Otto, Boisselle, and Sklar LLP

(57) ABSTRACT

A water treatment unit mounted in a washing machine, comprising a cartridge type case. An inflow port and an outflow port connected to a water supply port and a water receiving port formed in the washing machine are formed in the case. An electrode eluting metal ions in water by energization is disposed in the case and a connector part for supplying power to the electrode is disposed on the outer surface of the case. The case is formed slender and the inflow port and the outflow port are formed in the case, concentrically to each other, at positions near one end thereof and the connector part is disposed at a position near the other end.

20 Claims, 16 Drawing Sheets

WASHING MACHINE WITH WATER TREATMENT UNIT

CROSS-REFERENCE TO RELATED APPLICATIONS

This application is a U.S. National Stage Application of International Application PCT/JP04/11257 filed Aug. 5, 2004, which is published as WO 2005/044737on May 19, 2005, the disclosure of which is expressly incorporated by reference herein in its entirety.

TECHNICAL FIELD

The present invention relates to a water treatment unit for preparing water suitable for the purpose of a particular appliance, and to an appliance provided with such a water treatment unit.

BACKGROUND ART

The user of an appliance that uses water often wishes to alter the properties of the water he or she uses to make it suitable for the purpose of the appliance. For example, the user of a washing machine generally wishes to treat laundry with antimicrobial treatment. In response to such needs, various proposals have been made, of which examples are disclosed in the publications listed below. Specifically, Publication 1 discloses an electric washing machine equipped with an ion generator that generates metal ions, such as silver or copper ions, that exert a sterilizing effect. Publication 2 discloses a washing machine that sterilizes washing fluid by applying an electric field thereto. Publication 3 discloses a washing machine furnished with a silver ion adding unit that adds silver ions to washing fluid. Publication 4 discloses a washing machine that performs washing and rinsing by using electrolyzed water obtained through electrolysis of water. Washing machines that administer antimicrobial treatment by using silver ions have already been commercially available.

Publication 1: Japanese Utility Model Application No. H5-74487 (p. 1, FIG. 1)
Publication 2: Japanese Patent Application Laid-Open No. 2000-93691 (p. 2, FIG. 1)
Publication 3: Japanese Patent Application Laid-Open No. 2001-276484 (p. 2, FIG. 1)
Publication 4: Japanese Patent Application Laid-Open No. 2003-24692 (pp. 3-6, FIGS. 8, 10, 12, and 17)

DISCLOSURE OF THE INVENTION

Problems to be Solved by the Invention

When treating water to prepare water suitable for the purpose of a particular appliance, it is most important to maintain water treatment performance. Through long-time use, water treatment performance deteriorates, eventually requiring some appropriate action to be taken for its restoration. If this action involves calling in an expert, it is too inconvenient and costly.

In view of the conventionally experienced inconvenience described above, it is an object of the present invention to provide a contrivance that permits a user to restore water treatment performance by him or herself with ease.

Means for Solving the Problem

To achieve the above object, according to the present invention, a water treatment unit is constructed as follows. A water treatment unit that is detachably attached to an appliance that uses water is provided with: a cartridge-type case that has an inflow port and an outflow port that respectively connect to a water feed port and a water receive port provided on the appliance; and electrodes that are housed inside the case and that exert a water treatment effect when energized.

With this construction, when water treatment performance deteriorates, the user can remove the water treatment unit and replace it with a new one by him or herself. Thus, it is possible to maintain water treatment performance without calling in an expert. Moreover, the electric current that needs to be fed to the electrodes can be easily obtained from the appliance. Moreover, unless the water feed port and water receive port are occupied by the water treatment unit, the appliance cannot be used. This helps avoid the appliance being used without water treatment ready.

According to the present invention, in the water treatment unit described above, connector portions via which to energize the electrodes are provided on an exterior surface of the case.

With this construction, when the water treatment unit is attached to and detached from the appliance, electrical connection and disconnection between them can be easily achieved.

According to the present invention, in the water treatment unit described above, the inflow port and outflow port are arranged concentrically.

With this construction, as compared with one in which the inflow port and outflow port are formed elsewhere, the water treatment unit can be easily connected to the appliance, and the connection part can be made compact. Moreover, watertight sealing between the water treatment unit and the appliance can be achieved with a simple structure.

According to the present invention, in the water treatment unit described above, the water treatment unit is coupled to the appliance by bayonet coupling means.

With this construction, the water treatment unit can be attached and detached easily and securely.

According to the present invention, in the water treatment unit described above, the case has an elongate shape, with the inflow port and outflow port disposed near one end thereof and the connector portions disposed near the other end thereof.

With this construction, the connection part through which to pass water and the connection part through which to feed electric current can be arranged without the risk of interference.

According to the present invention, in the water treatment unit described above, the electrodes extend from near the connector portions toward the outflow port, and, inside the case, a partition wall is formed that guides water that has flowed in through the inflow port toward the parts of the electrodes near the connector portions.

With this construction, water can be made to flow along the entire length of the electrodes so as to fully receive the water treatment effected by energization. Moreover, the electrodes can be given a necessary and sufficient length, and in addition, since they can be formed rectilinear, they are easy to produce.

According to the present invention, in the water treatment unit described above, water is treated by applying a voltage between the electrodes and thereby eluting therefrom metal ions that exert an antimicrobial effect.

With this construction, it is possible to administer antimicrobial treatment to an object or article by dipping it in water into which are eluted metal ions that have an antibacterial effect. When metal ion elution performance deteriorates, the water treatment unit can be replaced to maintain the antimicrobial effect.

According to the present invention, an appliance incorporates one of the water treatment units described above.

With this construction, by the use of treated water, it is possible to administer treatment that suits the purpose of the appliance to an object or article that the appliance handles. Moreover, the water treatment unit can be replaced so that the treatment that suits the purpose can be administered permanently.

According to the present invention, in the appliance described above, the water treatment unit is attached to an exterior surface of the appliance.

With this construction, the water treatment unit can be easily replaced.

According to the present invention, in the appliance described above, the appliance is a washing machine.

With this construction, the water treatment unit can be used to treat laundry until the life of the electrodes is reached. Moreover, even when the life of the electrodes is reached, simply by replacing the water treatment unit, it is possible to continue treating laundry for a long period.

Advantages of the Invention

According to the present invention, a water treatment unit that is detachably attached to an appliance that uses water is provided with: a cartridge-type case that has an inflow port and an outflow port that respectively connect to a water feed port and a water receive port provided on the appliance; and electrodes that are housed inside the case and that exert a water treatment effect when energized. Thus, when water treatment performance deteriorates, the user can remove the water treatment unit and replace it with a new one by him or herself and thereby maintain water treatment performance without calling in an expert. The electric current that needs to be fed to the electrodes can be easily obtained from the appliance. Moreover, unless the water feed port and water receive port are occupied by the water treatment unit, the appliance cannot be used, and this helps avoid the appliance being used without water treatment ready, ensuring the use of treated water.

When the water treatment unit constructed as described above is incorporated in an appliance, by the use of treated water, it is possible to administer treatment that suits the purpose of the appliance to an object or article that the appliance handles. Moreover, by replacing the water treatment unit, it is possible to permanently administer the treatment that suits the purpose. In a case where the appliance is a washing machine, the water treatment unit can be used to treat laundry until the life of the electrodes is reached. When the life of the electrodes is reached, simply by replacing the water treatment unit, it is possible to continue treating laundry for a long period.

LIST OF REFERENCE SYMBOLS

Figure 1:
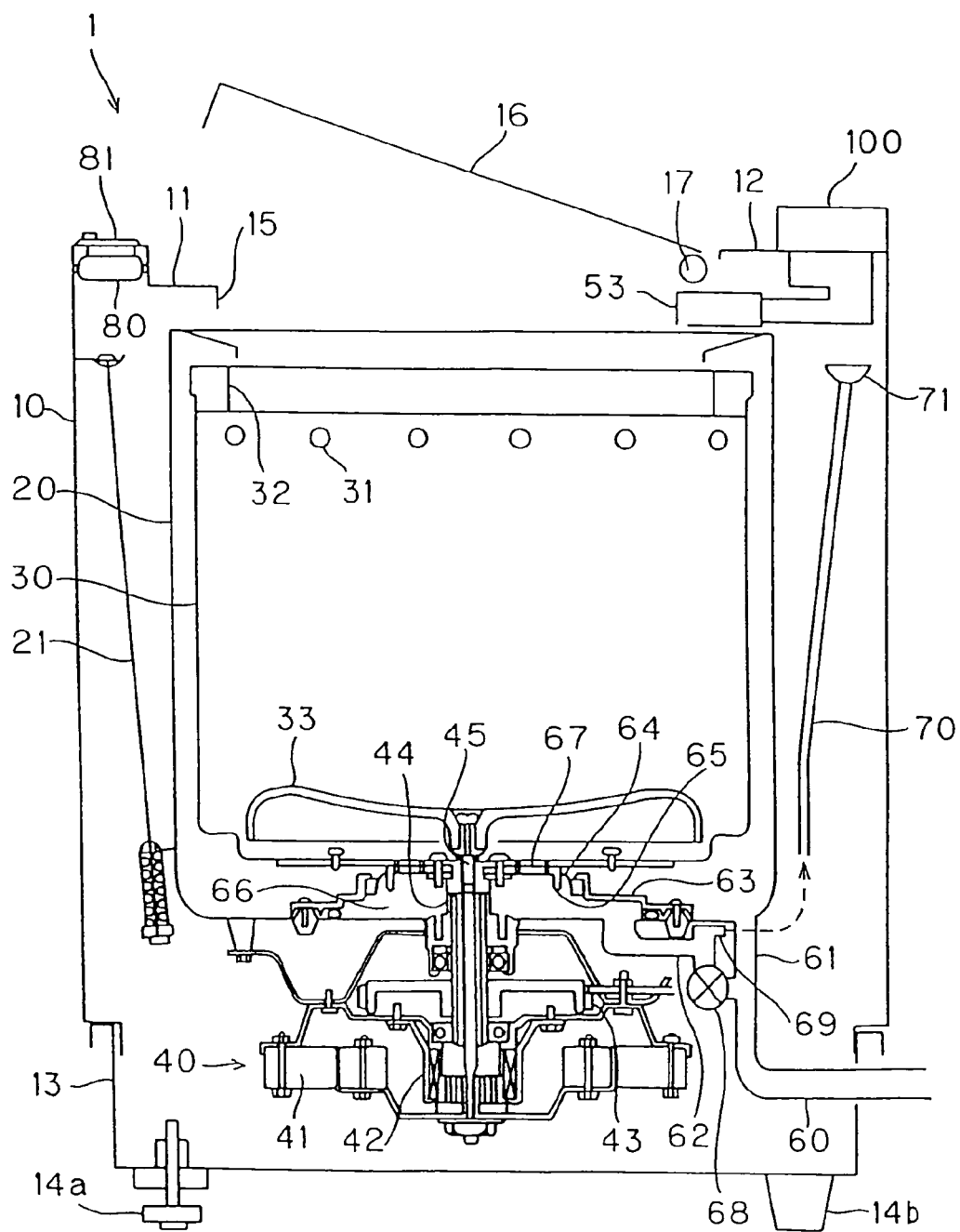
FIG. 1 is a vertical sectional view of a washing machine embodying the invention.

1 Washing machine
10 Cabinet
20 Water tub
30 Washing tub
33 Pulsator
40 Drive unit
50 Water feed valve
53 Water feed port
68 Drain valve
80 Controller
81 Operation/display unit
100 Water treatment unit
101 Case
107 Inflow port
108 Outflow port
112 Connector portion
113, 114 Electrodes
120 Drive circuit
130 Central controller
171 Water feed port
172 Water receive port

BEST MODE FOR CARRYING OUT THE INVENTION

Hereinafter, an embodiment of the present invention, in which a water treatment according to the present invention is incorporated in a washing machine, will be described with reference to FIGS. 1 to 20.

FIG. 1 is a vertical sectional view showing the overall construction of a washing machine 1. The washing machine 1 is of the fully automatic type, and has a cabinet 10. The cabinet 10 is box-shaped, is formed of a metal or synthetic resin, and has openings at its top and bottom. The top opening of the cabinet 10 is covered with a top plate 11, which is formed of a synthetic resin and is fixed to the cabinet 10 with screws. In FIG. 1, the front and rear of the washing machine 1 point leftward and rightward, respectively. A rear portion of the top surface of the top plate 11 is covered with a back panel 12, which is formed of a synthetic resin and is fixed to the cabinet or the top plate 11 with screws. The bottom opening of the cabinet 10 is covered with a base 13, which is formed of a synthetic resin and is fixed to the cabinet 10 with screws. None of the screws mentioned thus far are shown in the figure.

In four corners of the base 13, feet 14a and 14b are provided for supporting the cabinet 10 on a floor. The rear feet 14b are fixed feet that are integrally formed with the base 13. The front feet 14a are screw feet of which the supporting level can be adjusted. Turning these permits the washing machine 1 to be leveled.

In the top plate 11, a laundry inlet opening 15 is formed through which laundry is put in the washing tub described later. The laundry inlet opening 15 is covered with a lid 16 from above. The lid 16 is coupled to the top plate 11 with a hinge 17 so as to be pivotable in a vertical plane.

Inside the cabinet 10, a water tub 20 and a washing tub 30, which serves also as a spin-drying tub, are provided. The water tub 20 and the washing tub 30 both have the shape of a cylindrical cup open at its top, and the two tubs are arranged concentrically with their axes vertical and with the washing tub 30 placed inside the water tub 20. The water tub 20 is suspended from the cabinet 10 with suspension members 21. The suspension members 21 are arranged in four places so as to connect a lower portion of the outer surface of the water tub 20 to corner portions of the inner surface of the cabinet 10, and support the water tub 20 in such a way as to permit it to swing in a horizontal plane.

The washing tub 30 has a circumferential wall that widens upward with a gentle taper. This circumferential wall has a plurality of drain holes 31 formed in a ring-shaped arrangement around its topmost portion, and has, other than these drain holes, no opening that permits passage of liquid. That is, the washing tub 30 is of the so-called "holeless" type. Around the rim of the top opening of the washing tub 30, a ring-shaped balancer 32 is fitted for suppressing the vibration that the washing tub 30 produces when rotated at high speed for the spin-drying of laundry. Inside the washing tub 30, on its bottom surface, a pulsator 33 is provided for producing a current of washing or rinsing water inside the tub 30.

The water tub 20 has a drive unit 40 fitted to its bottom surface from below. The drive unit 40 includes a motor 41, a clutch mechanism 42, and a brake mechanism 43, and has a spin-drying spindle 44 and a pulsator spindle 45 protruding from its center upward. The spin-drying spindle 44 and the pulsator spindle 45 form a double-spindle structure, with the pulsator spindle 45 placed inside the spin-drying spindle 44. The two spindles both penetrate the water tub 20. The spin-drying spindle 44 is then connected to the washing tub 30 so as to support it. On the other hand, the pulsator spindle 45 further penetrates the washing tub 30, and is then connected to the pulsator 33 to support it. Between the spin-drying spindle 44 and the water tub 20, and between the spin-drying spindle 44 and the pulsator spindle 45, sealing members are provided for preventing leakage of water.

Inside the space below the back panel 12, a water feed valve 50 (see FIG. 2) is provided that is opened and closed electromagnetically. To the water feed valve 50 is fed clean water such as tap water though a water feed route, which will be described later. From the water feed valve 50 extends a water feed pipe 52. The water feed pipe 52 is, at the other end, connected to a water feed port 53 that is container-shaped. The water feed port 53 is placed above the inside of the washing tub 30, and has a structure as shown in FIG. 2.

Figure 2:
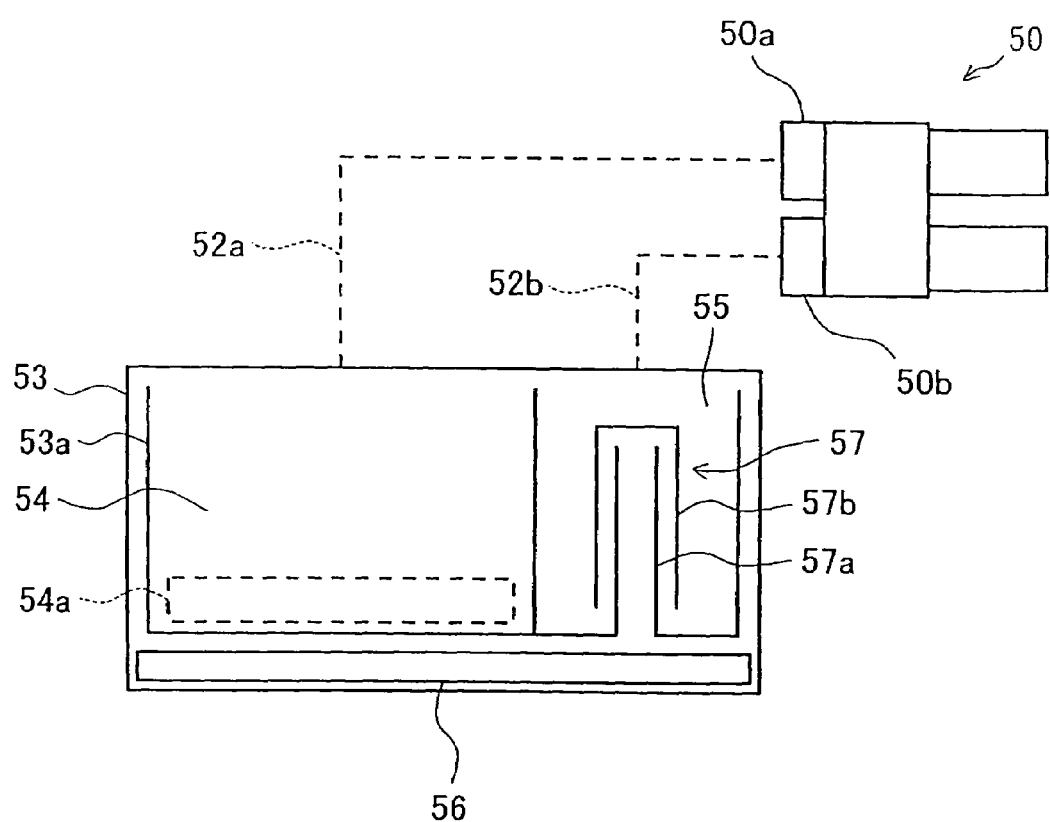
FIG. 2 is a vertical sectional view schematically showing the water feed port.

FIG. 2 is a schematic vertical sectional view of the water feed port 53, as seen from in front. Into the interior of the water feed port 53, a drawer 53a is inserted from in front. The interior of the drawer 53a is divided into a left-hand and a right-hand compartment. The left-hand compartment is a detergent compartment 54 used as a preparatory space for keeping detergent in. The right-hand compartment is a treatment agent compartment 55 used as a preparatory space for keeping a treatment agent in. In a rear bottom portion of the detergent compartment 54, a horizontally elongate outflow port 54a is formed. The water that has flowed out through the outflow port 54a first falls into a bottom portion of the water feed port 53, and is then poured into the washing tub 30 through a horizontally elongate water serve port 56 formed in the front face of the water feed port 53.

Inside the treatment agent compartment 55 is provided a siphon 57. The siphon 57 is composed of an inner pipe 57a that rises vertically from the bottom surface of the treatment agent compartment 55 and a cap-shaped outer pipe 57b that is fitted around the inner pipe 57a. Between the inner pipe 57a and the outer pipe 57b is formed a gap that permits passage of water. The inner pipe 57a is, at the bottom end thereof, open toward the bottom of the water feed port 53. The outer pipe 57b is located with a gap left between the bottom end thereof and the bottom surface of the treatment agent compartment 55 so that this gap serves as a water inlet. When water is fed into the treatment agent compartment 55 until the water level becomes higher than the top end of the inner pipe 57a, on the principle of a siphon, water is sucked out of the treatment agent compartment 55 through the siphon 57, and falls toward the bottom of the water feed port 53. From there, the water is poured into the washing tub 30 through the water serve port 56.

The feed valve 50 is composed of a main feed valve 50a and a sub feed valve 50b. A connecting pipe 51 is common to both the main and sub feed valves 50a and 50b. The water feed pipe 52 is also composed of a main feed pipe 52a that is connected to the main feed valve 50a and a sub feed pipe 52b that is connected to the sub feed valve 50b.

The main feed pipe 52a is connected to the ceiling wall of the water feed port 53, right above the detergent compartment 54, and serves to feed water into the detergent compartment 54. The sub feed pipe 52b is connected to the ceiling wall of the water feed port 53, right above the treatment agent compartment 55, and serves to feed water into the treatment agent compartment 55. Thus, the route running from the main feed pipe 52a via the detergent compartment 54 to the washing tub 30 is provided separately from the route running from the sub feed pipe 52b via the treatment agent compartment 55 to the washing tub 30.

Back in FIG. 1, to the bottom of the water tub 20 is fitted a drain hose 60 by way of which water inside the water tub 20 and the washing tub 30 is drained out of the cabinet 10. Water flows into the drain hose 60 from drain pipes 61 and 62. The drain pipe 61 is connected to the bottom surface of the water tub 20, at a place near the circumference thereof. The drain pipe 62 is connected to the bottom surface of the water tub 20, at a place near the center thereof.

A ring-shaped partition wall 63 is fixed on the interior bottom surface of the water tub 20 so as to enclose the portion thereof to which the drain pipe 62 is connected. In an upper portion of the partition wall 63 is fitted a ring-shaped sealing member 64. This sealing member 64 makes contact with a disk 65 fixed on the exterior bottom surface of the washing tub 30, and thereby forms a separate drain space 66 between the water tub 20 and the washing tub 30. The drain space 66 leads via a drain outlet 67 formed in the bottom of the washing tub 30 to the interior of the washing tub 30.

The drain pipe 62 is fitted with a drain valve 68 that is electromagnetically opened and closed. In a portion of the drain pipe 62 located on the upstream side of the drain valve

68, an air trap 69 is provided. From the air trap 69 extends a lead pipe 70. To the upper end of the lead pipe 70 is connected a water level switch 71.

In a front-side portion of the cabinet 10, a controller 80 is provided. The controller 80 is located beneath the top face plate 11. The controller 80 receives operation instructions from the user via an operation/display unit 81 provided on the top surface of the top face plate 11, and feeds operation commands to the drive unit 40, feed valve 50, and drain valve 68. The controller 80 also feeds display commands to the operation/display unit 81. The controller 80 includes a control circuit for driving a water treatment unit, which will be described later.

Now, the operation of the washing machine 1 will be described. First, the lid 16 is opened, and laundry is put in the washing tub 30 through the laundry inlet opening 15. Then, the drawer 53a is pulled out of the water feed port 53, and detergent is put in the detergent compartment 54. As necessary, a treatment agent is put in the treatment agent compartment 55 of the water feed port 53. With the detergent and the treatment agent put in, the drawer 53a is pushed back into the water feed port 53. The treatment agent may be put in in the middle of a washing procedure.

With the detergent and the treatment agent ready to be added, the lid 16 is closed, and the operation buttons on the operation/display unit 81 are appropriately operated to select desired washing conditions. When finally a start button is pressed, selected processes are performed according to the flow charts shown in FIGS. 3 to 6.

Figure 3:
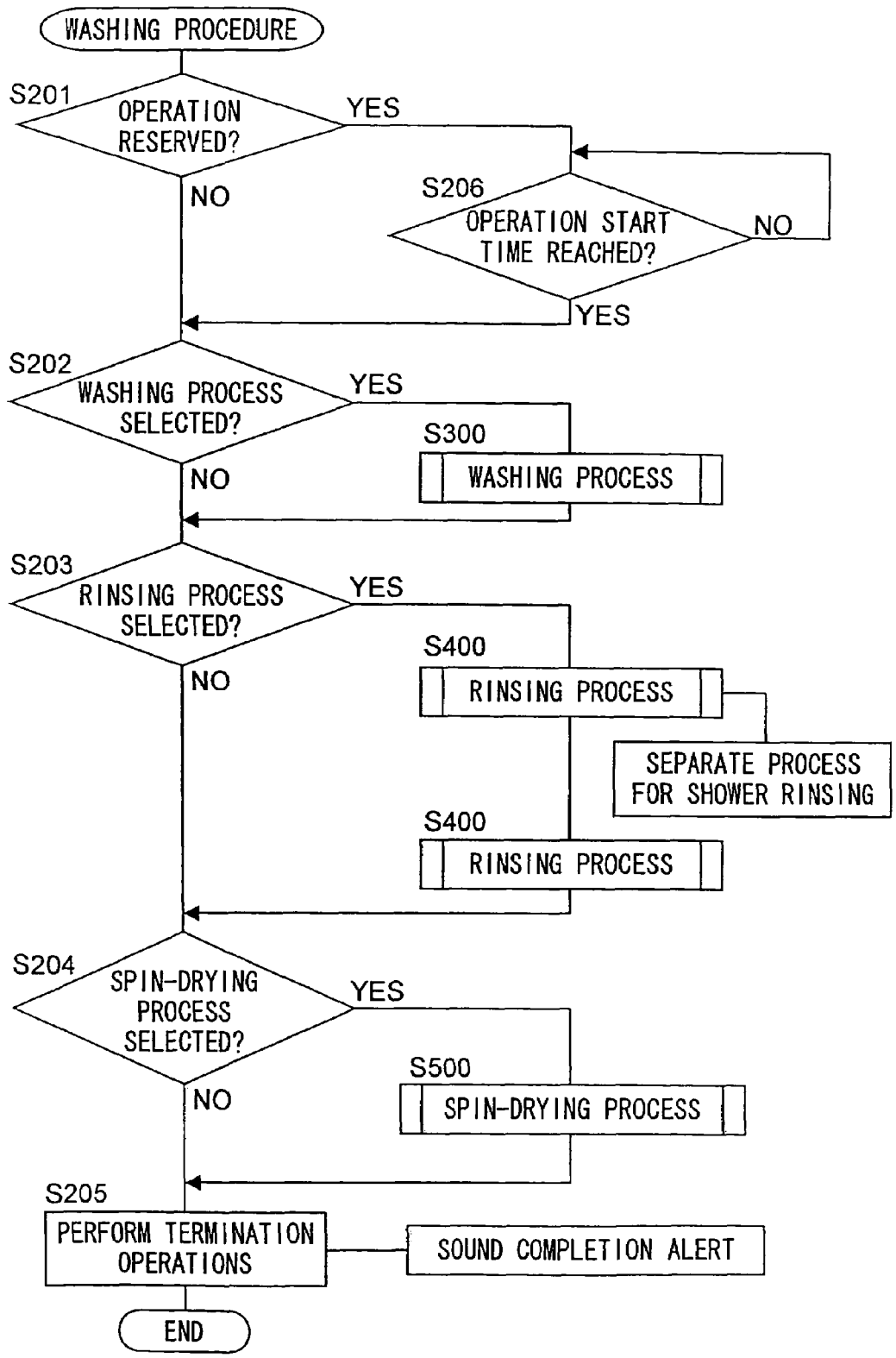
FIG. 3 is a flow chart of the entire washing procedure.

FIG. 3 is a flow chart showing the entire washing procedure. In step S201, whether or not operation is reserved, i.e., whether or not washing is programmed to start at a specified time, is checked. If operation is reserved, the operation flow proceeds to step S206; if not, the operation flow proceeds to step S202.

In step S206, whether or not the operation start time has reached is checked. When the operation start time has reached, then the operation flow proceeds to step S202.

In step S202, whether or not a washing process is selected is checked. If a washing process is selected, the operation flow proceeds to step S300. The contents of the washing process in step S300 will be described later with reference to the flow chart shown in FIG. 4. On completion of the washing process, the operation flow proceeds to step S203. If a washing process is not selected, the operation flow proceeds directly from step S202 to step S203.

In step S203, whether or not a rinsing process is selected is checked. If a rinsing process is selected, the operation flow proceeds to step S400. The contents of the rinsing process in step S400 will be described later with reference to the flow chart shown in FIG. 5. On completion of the rinsing process, the operation flow proceeds to step S204. If a rinsing process is not selected, the operation flow proceeds directly from step S203 to step S204.

In step S204, whether or not a spin-drying process is selected is checked. If a spin-drying process is selected, the operation flow proceeds to step S500. The contents of the spin-drying process in step S500 will be described later with reference to the flow chart shown in FIG. 6. On completion of the spin-drying process, the operation flow proceeds to step S205. If a spin-drying process is not selected, the operation flow proceeds directly from step S204 to step S205.

In step S205, the controller 80, in particular the processing device (microcomputer) included therein, automatically performs a predetermined sequence of terminating operations. Moreover, the controller 80 sounds a completion alert to indicate the completion of the washing procedure. On completion of the entire procedure, the washing machine 1 is brought into a stand-by state in preparation for the next washing procedure.

Next, with reference to FIGS. 4 to 6, the washing, rinsing, and spin-drying processes will be described one by one.

Figure 4:
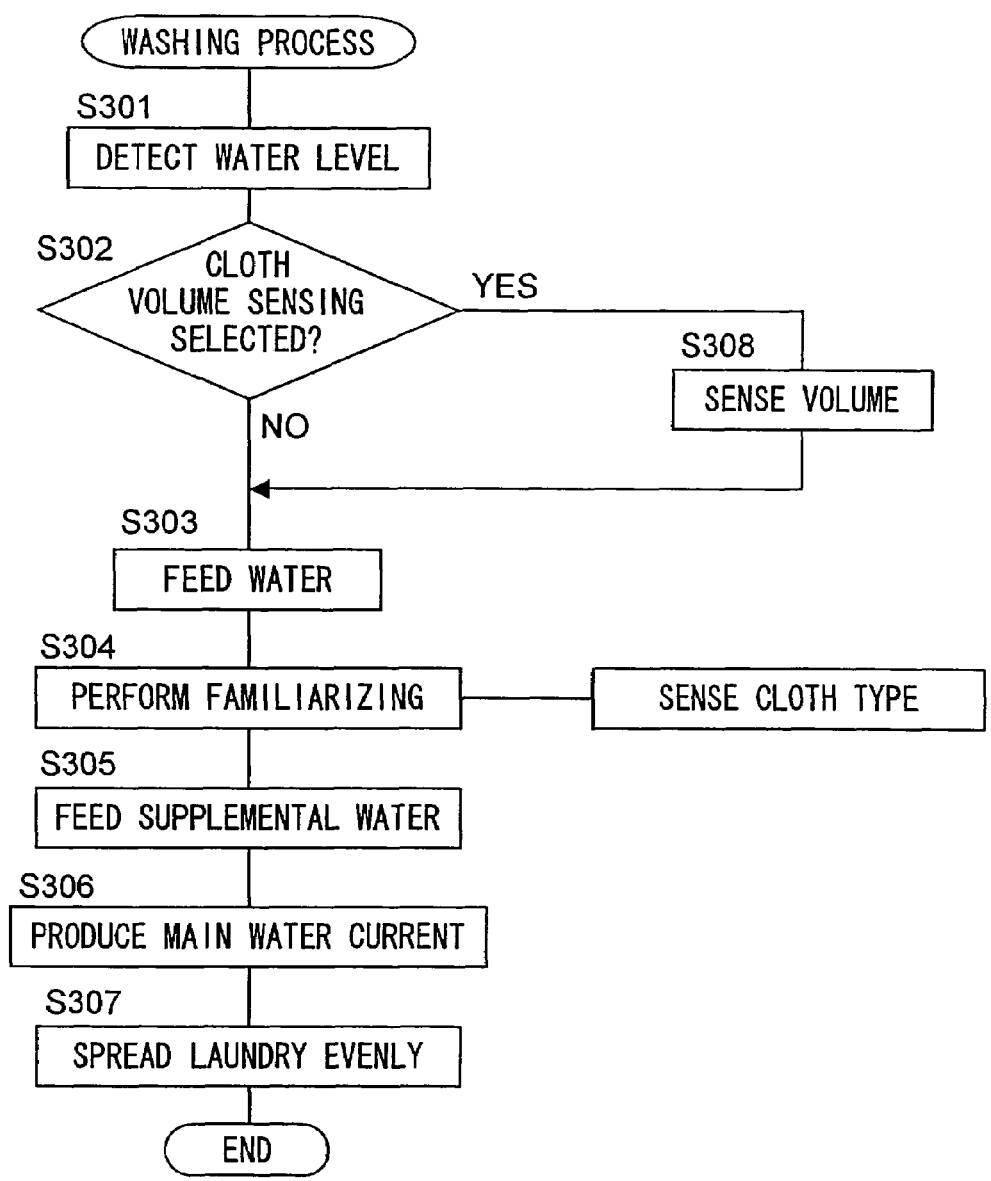
FIG. 4 is a flow chart of the washing process.
Figure 5:
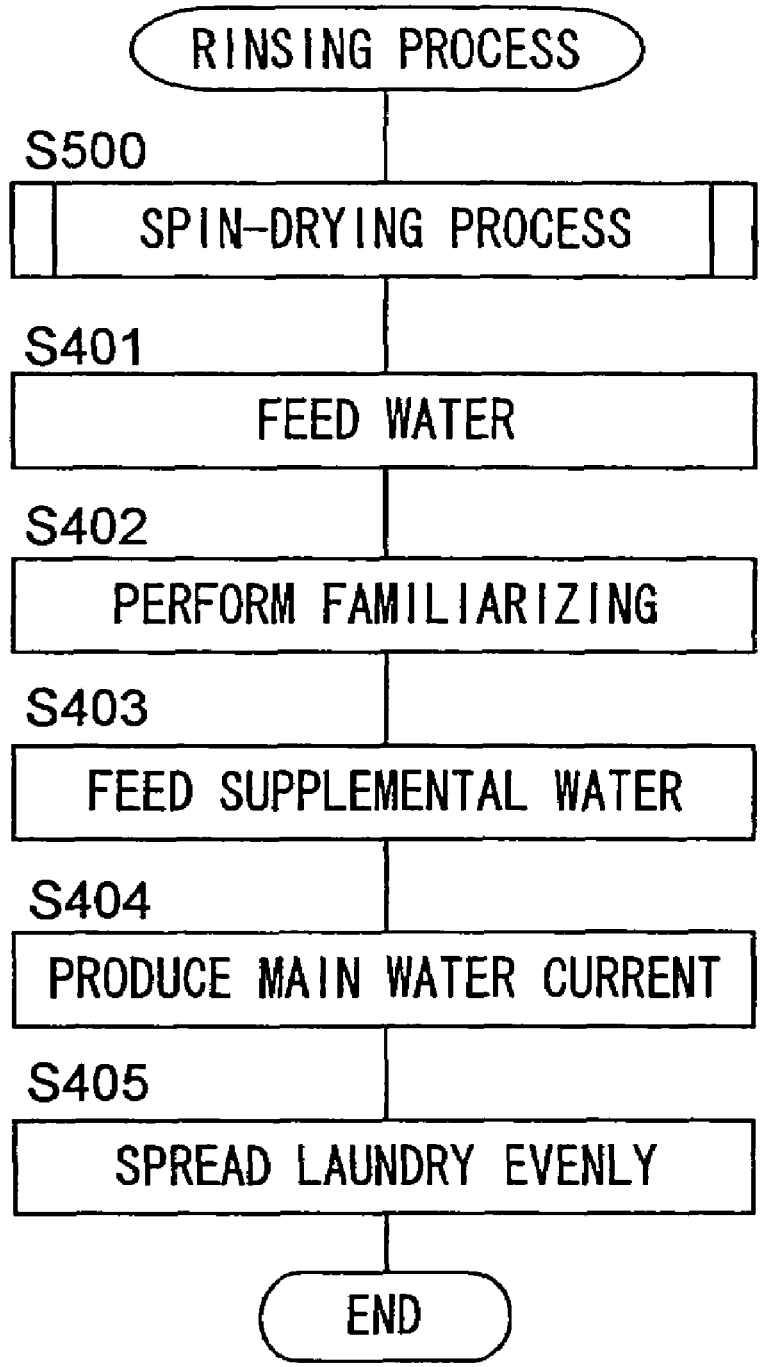
FIG. 5 is a flow chart of the rinsing process.

FIG. 4 is a flow chart showing the washing process. In step 301, the data of the water level inside the washing tub 30 as detected by the water level switch 71 is read. In step S302, whether or not the sensing of the volume of laundry is selected is checked. If the sensing of the volume of laundry is selected, the operation flow proceeds to step S308; if not, the operation flow proceeds directly from step S302 to step S303.

In step S308, on the basis of the rotation load of the pulsator 33, the volume of the laundry is measured. After the sensing of the volume, the operation flow proceeds to step S303.

In step S303, the main feed valve 50a is opened, and water is fed via the main feed pipe 52a and the water feed port 53 into the washing tub 30. At this time, mixed with the water, the detergent put in the detergent compartment 54 of the water feed port 53 is put in the washing tub 30. At this time point, the drain valve 68 is closed. When the water level switch 71 detects that the set water level is reached, the main feed valve 50a is closed, and the operation flow proceeds to step S304.

In step S304, familiarizing is performed. Specifically, the pulsator 33 is rotated alternately in the forward and reverse directions to agitate laundry and water to familiarize them with each other. This permits the laundry to absorb sufficient water. Moreover, it is also possible to permit the air caught in different parts of the laundry to escape. If, as a result of the familiarizing, the water level as detected by the water level switch 71 becomes lower than the original level, then, in step S305, the main feed valve 50a is opened to feed supplemental water so that the set water level is restored.

At this time, if the selected washing course includes "cloth type sensing," at the same time that the familiarizing is performed, the sensing of the cloth type is also performed. At the end of the familiarizing, how the water level has varied from the set water level is detected, and, if the drop in the water level is greater than a prescribed value, the cloth type is judged to be highly water-absorbing one.

When, in step S305, the set water level is obtained, the operation flow proceeds to step S306. In step S306, in accordance with the settings made by the user, the motor 41 rotates the pulsator 33 with a predetermined pattern to form, inside the washing tub 30, a main water current for washing. With this main water current, the laundry is washed. The brake mechanism 43 applies a brake to the spin-dry spindle 44 so that, even when the washing water and laundry move, the washing tub 30 does not rotate.

At the end of the period of the main water current, the operation flow proceeds to step S307. In step S307, the pulsator 33 rotates intermittently to make the laundry loose so that the laundry is spread evenly inside the washing tub 30. This is done in preparation for the spin-drying rotation of the washing tub 30.

Next, with reference to the flow chart shown in FIG. 5, the rinsing process will be described. First, in step S500, a spin-drying process is performed. This process will be described later with reference to the flow chart shown in FIG. 6. After this spin-drying process, the operation flow proceeds to step S401. In step S401, the main feed valve 50a is opened, and water is fed up to the set water level.

After the feeding of water, the operation flow proceeds to step S402. In step S402, familiarizing is performed. During this familiarizing in step S402, the laundry that has stuck to the washing tub 30 in step S500 (spin-drying process) is made loose therefrom, and is familiarized with water so as to absorb sufficient water.

After the familiarizing, the operation flow proceeds to step S403. If, as a result of the familiarizing, the water level as detected by the water level switch 71 becomes lower than the original level, then the main feed valve 50a is opened to feed supplemental water so that the set water level is restored.

After, in step S403, the set water level is restored, the operation flow proceeds to step S404. In step S404, in accordance with the settings made by the user, the motor 41 rotates the pulsator 33 with a predetermined pattern to form, inside the washing tub 30, a main water current for rinsing. With this main water current, the laundry is agitated, and is thereby rinsed. The brake mechanism 43 applies a brake to the spin-dry spindle 44 so that, even when the rinsing water and laundry move, the washing tub 30 does not rotate.

At the end of the period of the main water current, the operation flow proceeds to step S406. In step S405, the pulsator 33 rotates intermittently to make the laundry loose. This permits the laundry to be spread evenly inside the washing tub 30 in preparation for the spin-drying rotation.

In the above description, rinsing is performed as "stored-water rinsing" whereby rinsing is performed with rinsing water stored in the washing tub 30. It is, however, also possible to perform rinsing as "shower rinsing" whereby water is sprayed onto the laundry from the water feed port 53 while the washing tub 30 is kept rotating at low speed. Which mode of rinsing to adopt, or whether to adopt both of them, is determined through selection by the user.

Next, with reference to the flow chart shown in FIG. 6, the spin-drying process will be described. First, in step S501, the drain valve 68 is opened. Thus, the washing water inside the washing tub 30 is drained out of the drain space 66 via the drain pipe 62. The drain valve 68 is kept open during the spin-drying process.

When a predetermined period of time elapses and most of the washing water contained in the laundry has been expelled out of it, the clutch mechanism 42 so switches that the motor 41 now rotates the spin-drying spindle 44. This causes the washing tub 30 to rotate for spin-drying. At this time, the pulsator 33 rotates along with the washing tub 30.

As the washing tub 30 rotates at high speed, the laundry is pressed onto the interior circumferential wall of the washing tub 30 under centrifugal force. Thus, the washing water contained in the laundry collects on the interior surface of the circumferential wall of the washing tub 30. At this time, since the washing tub 30 is so tapered as to gradually widen upward as described earlier, the washing water acted upon by the centrifugal force rises along the interior surface of the washing tub 30. When the washing water reaches the upper end of the washing tub 30, it is discharged through the drain holes 31. After leaving the drain holes 31, the washing water hits the interior surface of the water tub 20, and then flows along the interior surface of the water tub 20 to the bottom of the water tub 20. Then, the washing water is discharged out of the cabinet 10 via the drain pipe 61 and the drain hose 60 connected thereto.

Figure 6:
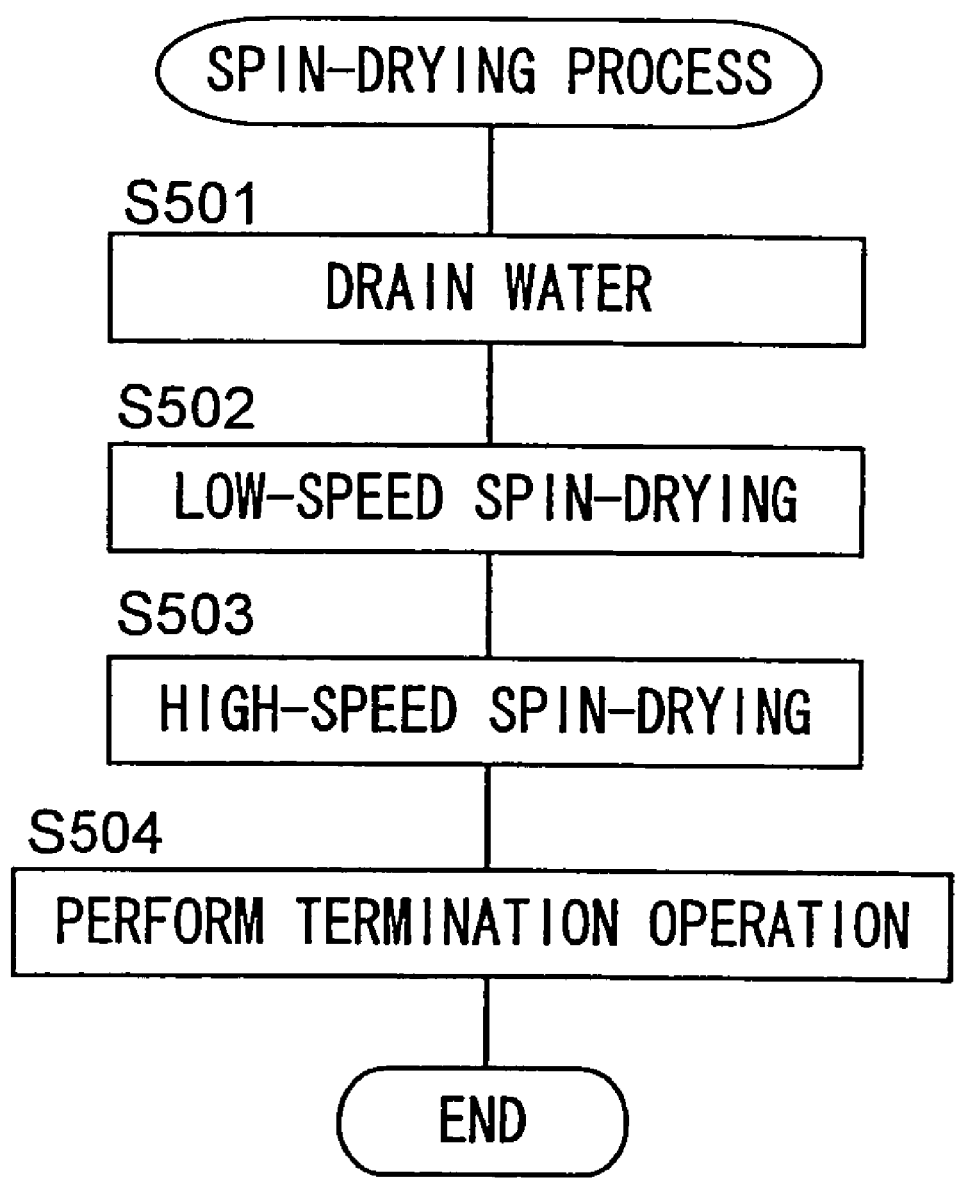
FIG. 6 is a flow chart of the spin-drying process.

In the operation flow shown in FIG. 6, first spin-drying is performed at relatively low speed in step S502, and then spin-drying is performed at high speed in step S503. After step S503, the operation flow proceeds to step S504. In step S504, the supply of electric power to the motor 41 is stopped, and the terminating operations are performed.

A water treatment unit 100 is detachably attached to the washing machine 1. Now, with reference to FIGS. 7 to 20, the construction and functions of the water treatment unit 100 and what role it plays when mounted on the washing machine 1 will be described.

Figure 7:
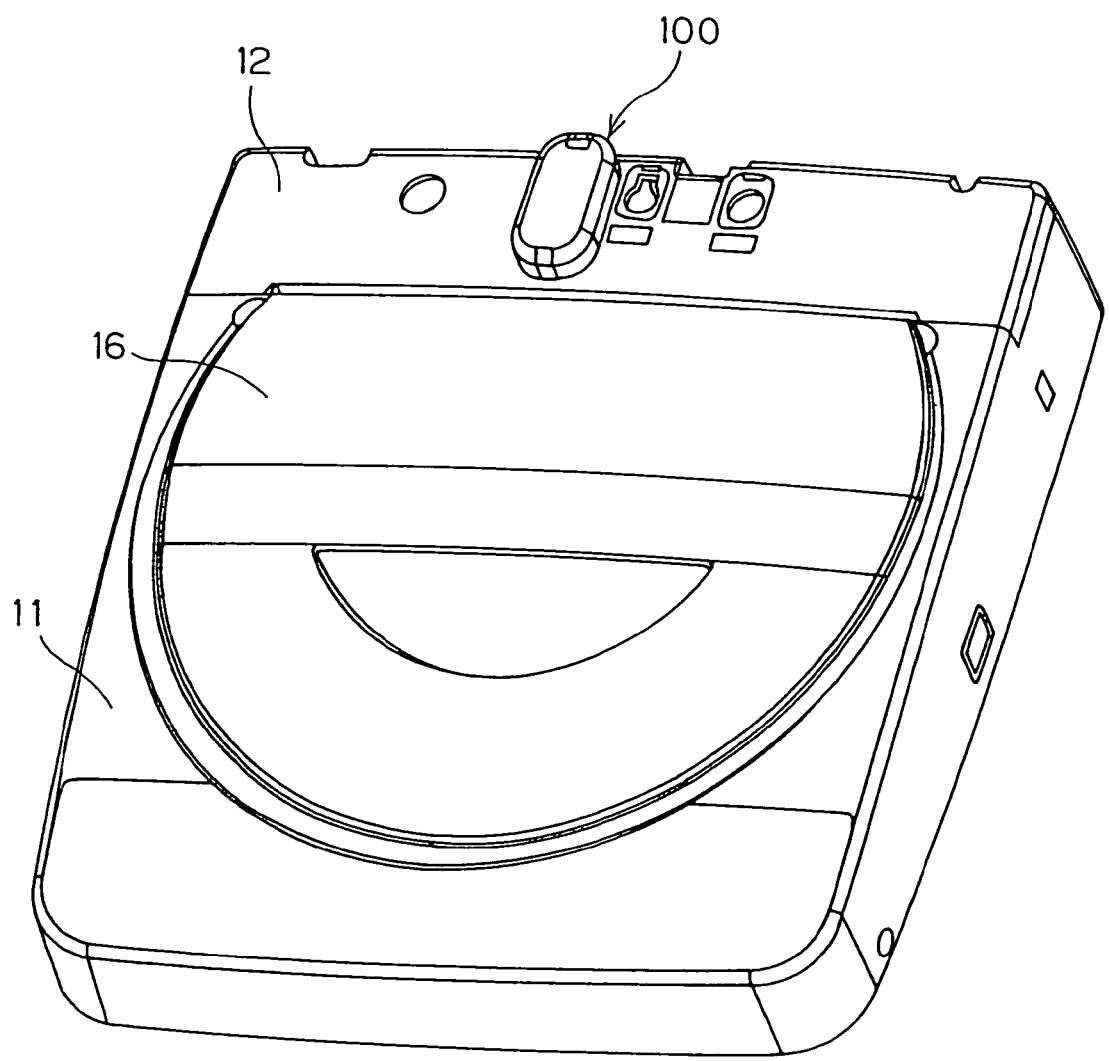
FIG. 7 is a perspective view of the components arranged on the top face of the washing machine.

FIG. 7 is a perspective view of the components arranged on the top face of the washing machine. The water treatment unit 100 is disposed substantially at the center of the top surface of the back panel 12. The water treatment unit 100 is constructed as shown in FIG. 8 to 19.

Figure 8:
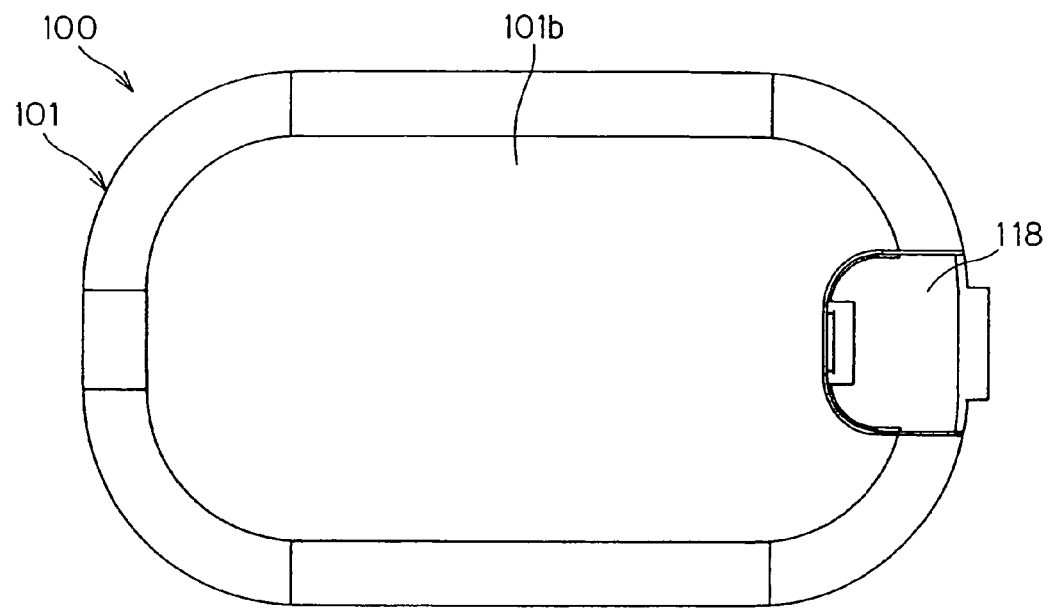
FIG. 8 is a plan view of the water treatment unit.
Figure 9:
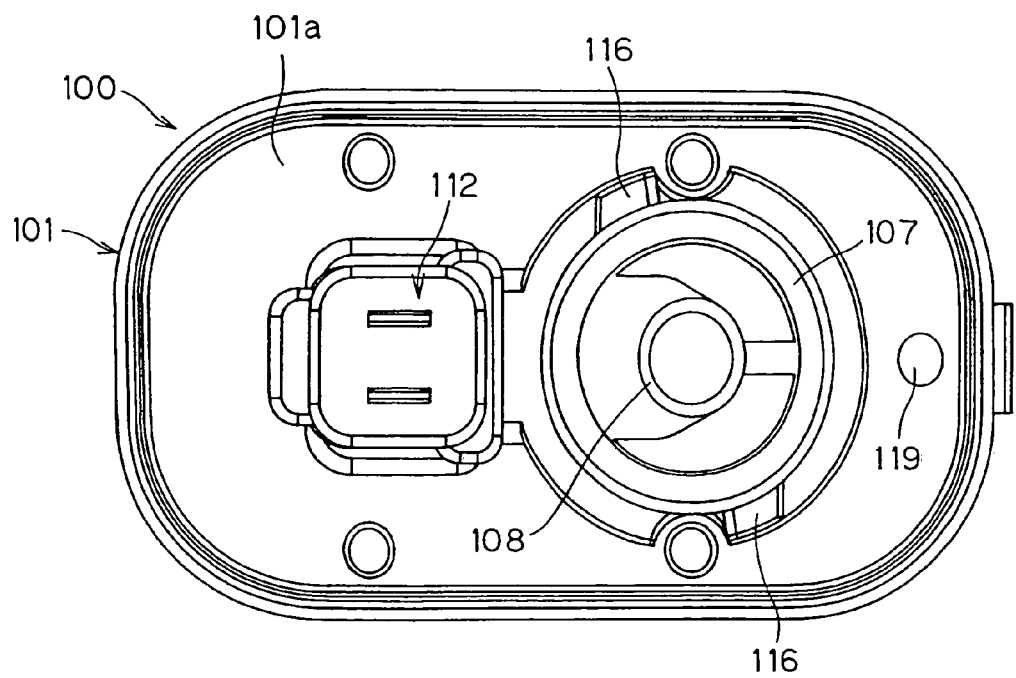
FIG. 9 is a bottom view of the water treatment unit.
Figure 10:
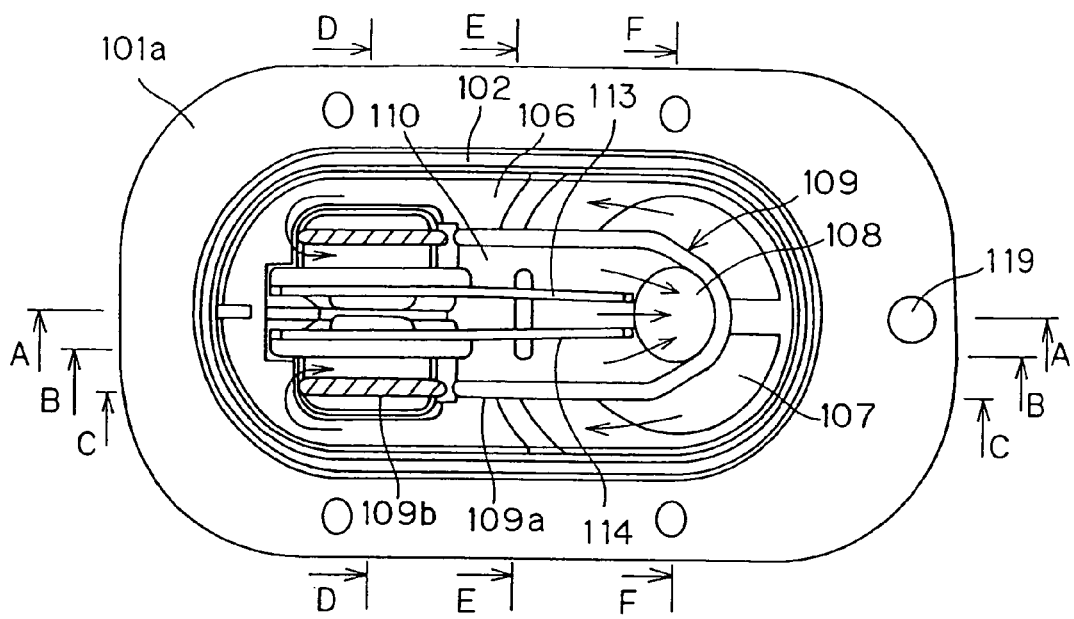
FIG. 10 is a plan view of the base of the case of the water treatment unit.
Figure 11:
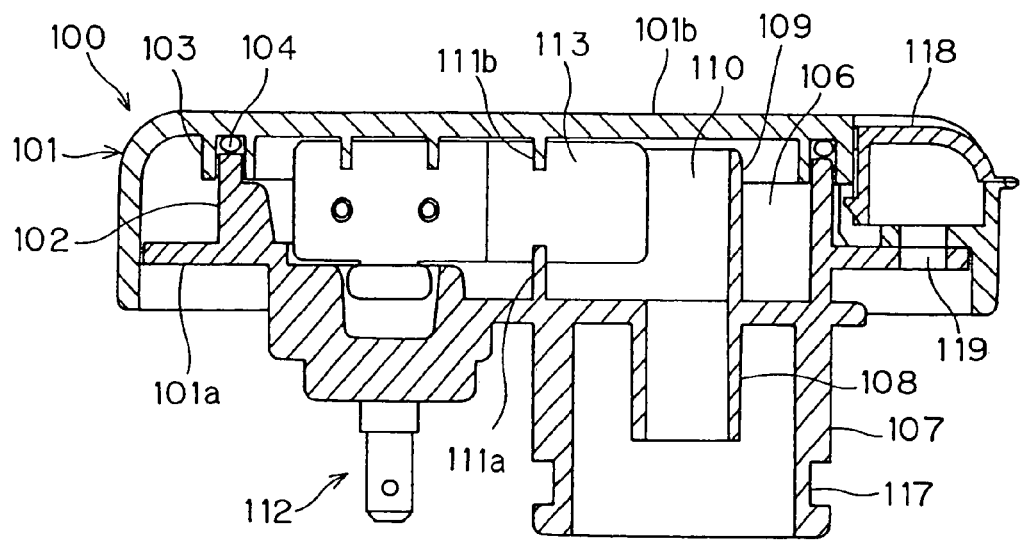
FIG. 11 is a vertical sectional view taken along line A-A in FIG. 10.
Figure 12:
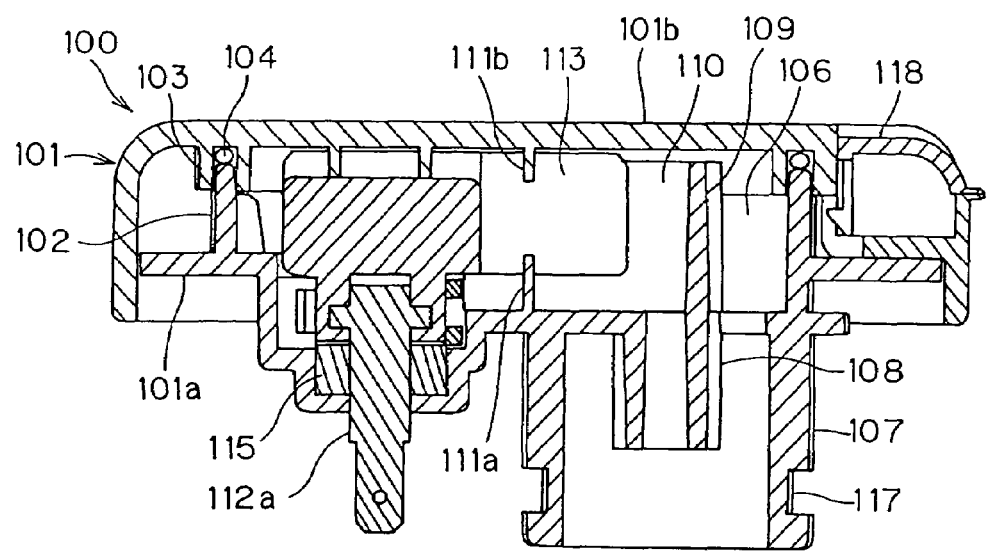
FIG. 12 is a vertical sectional view taken along line B-B in FIG. 10.
Figure 13:
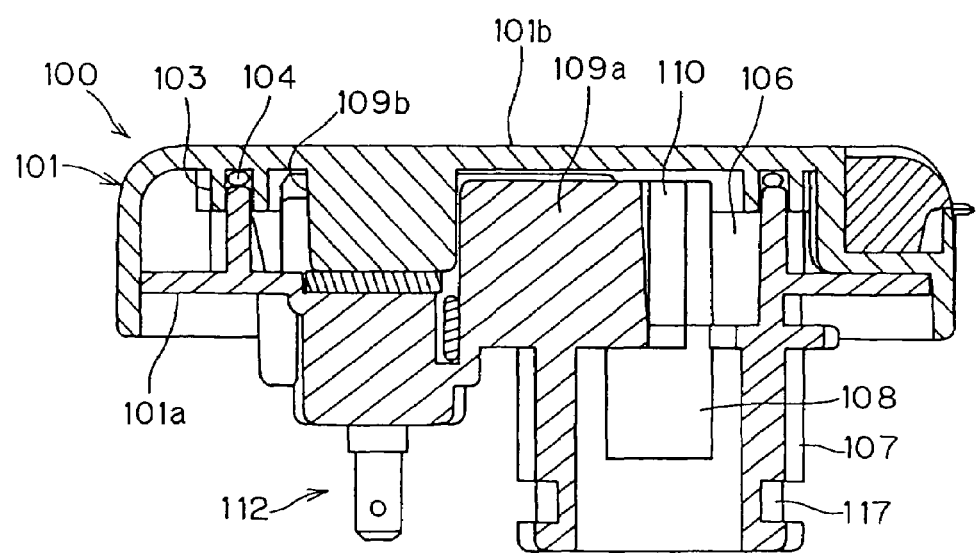
FIG. 13 is a vertical sectional view taken along line C-C in FIG. 10.
Figure 14:
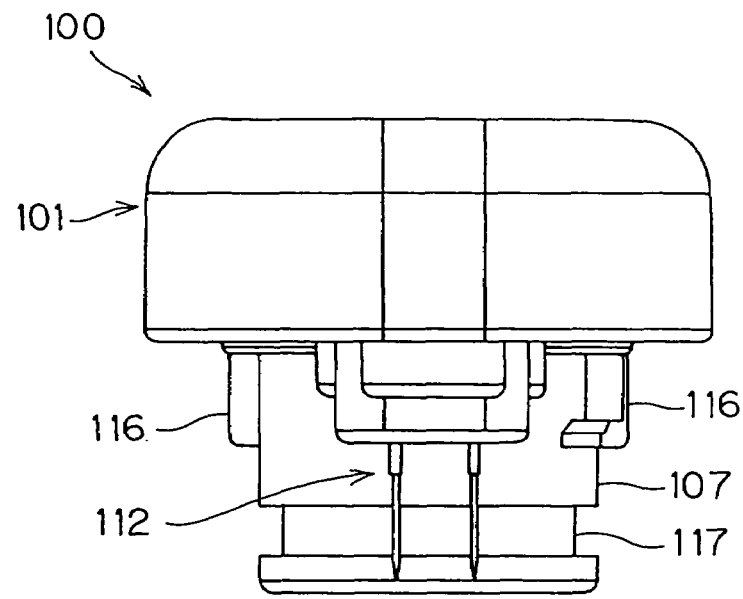
FIG. 14 is a side view of the water treatment unit.
Figure 15:
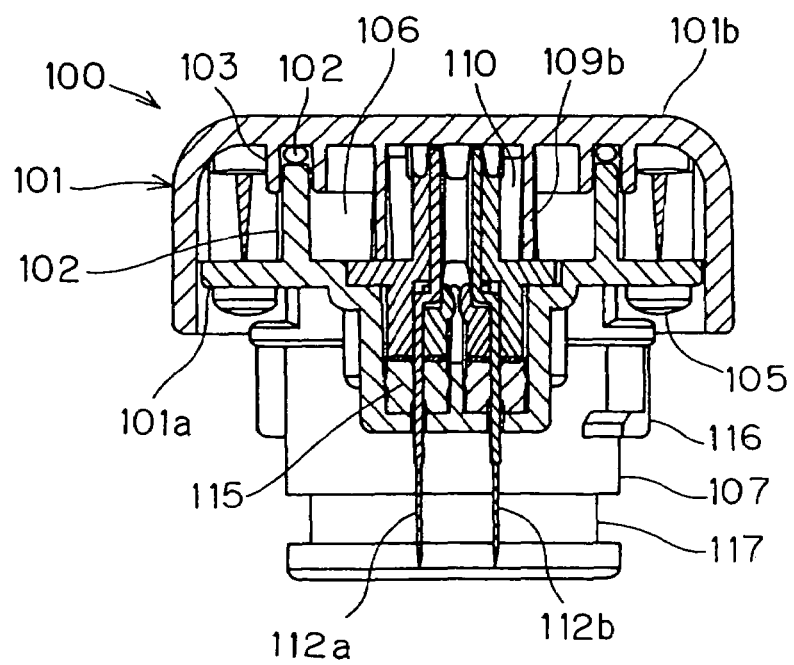
FIG. 15 is a vertical sectional view taken along line D-D in FIG. 10.
Figure 16:
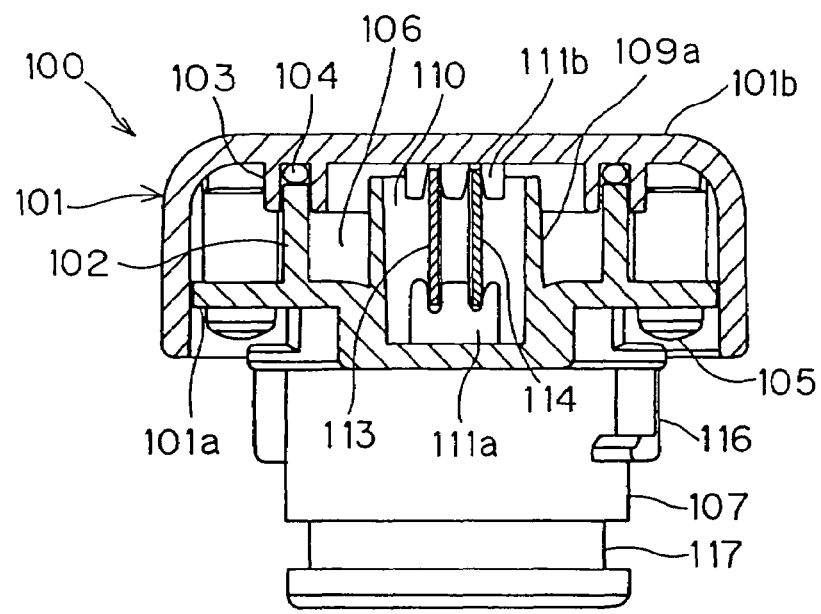
FIG. 16 is a vertical sectional view taken along line E-E in FIG. 10.
Figure 17:
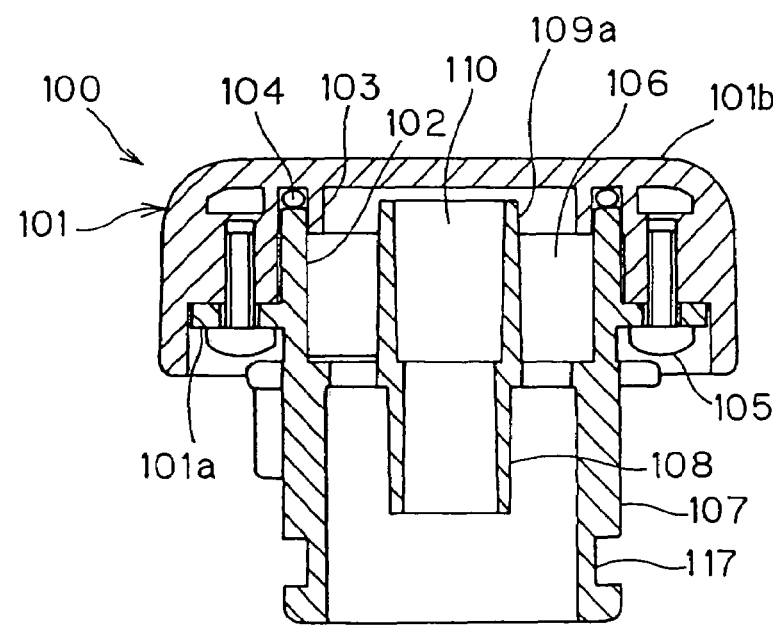
FIG. 17 is a vertical sectional view taken along line F-F in FIG. 10.
Figure 18:
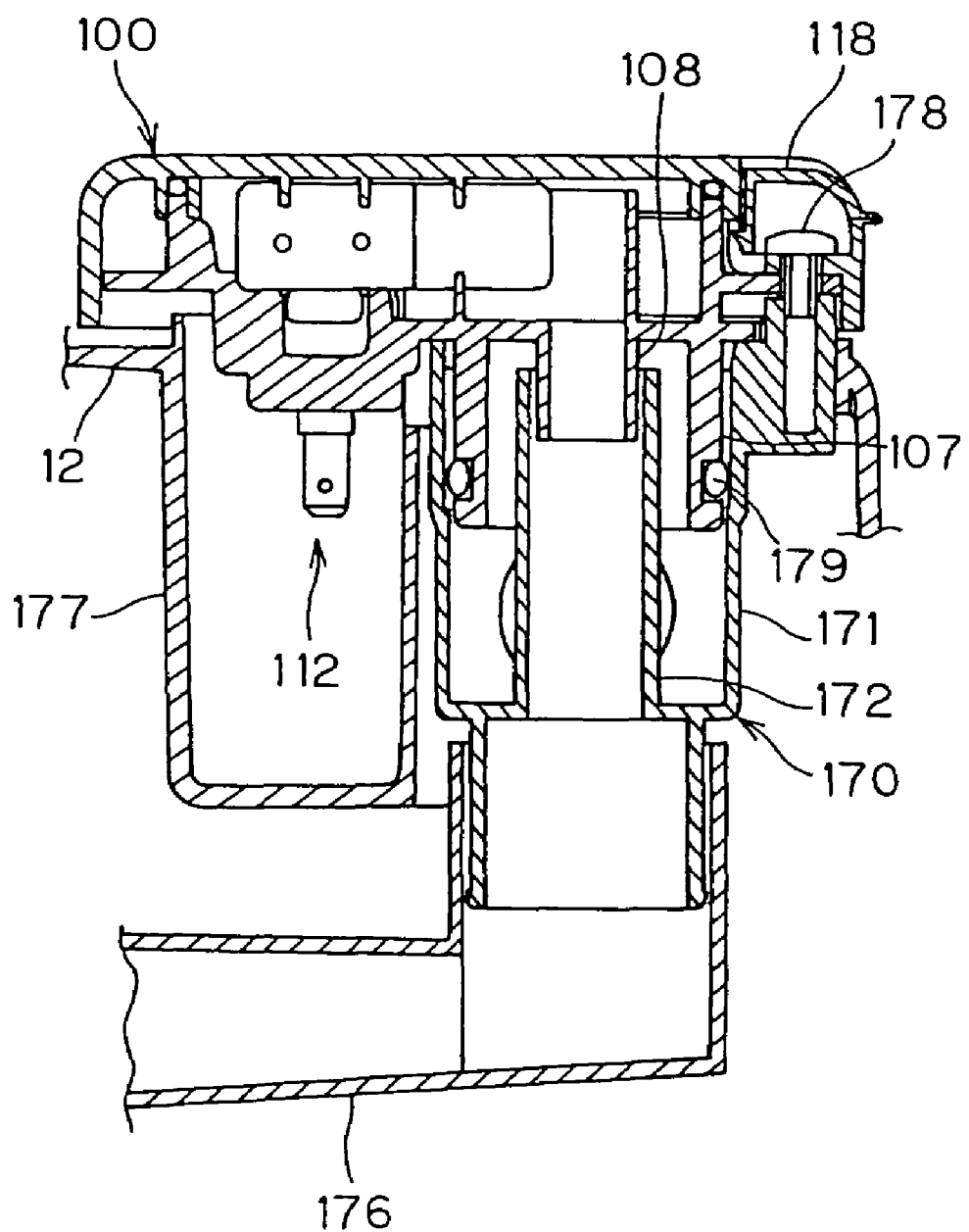
FIG. 18 is a partial vertical sectional view of the washing machine having the water treatment unit attached thereto.
Figure 19:
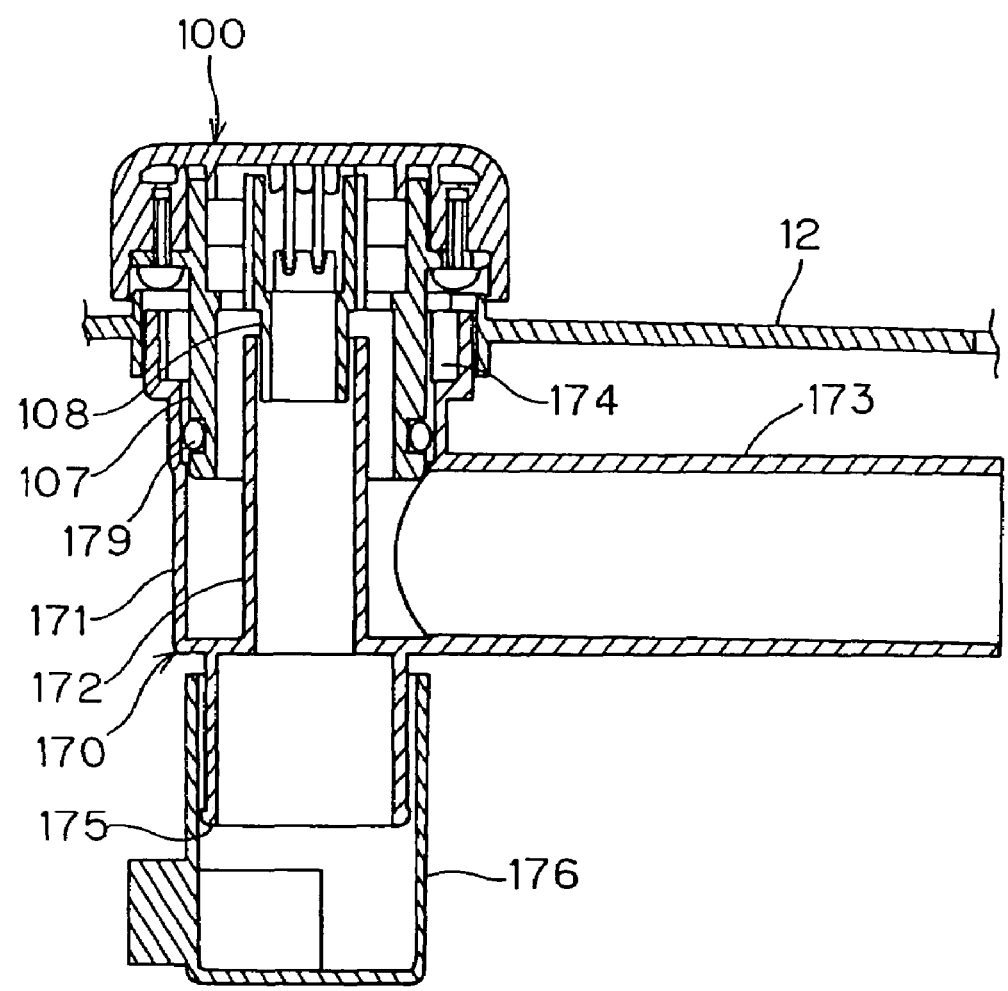
FIG. 19 is a partial vertical sectional view of the washing machine having the water treatment unit attached thereto, taken along a line perpendicular to FIG. 18.

FIG. 8 is a plan view of the water treatment unit 100, and FIG. 9 is a bottom view thereof. FIG. 10 is a plan view of the base of the case of the water treatment unit. FIG. 11 is a vertical sectional view taken along line A-A in FIG. 10, FIG. 12 is a vertical sectional view taken along line B-B in FIG. 10, and FIG. 13 is a vertical sectional view taken along line C-C in FIG. 10. FIG. 14 is a side view of the water treatment unit. FIG. 15 is a vertical sectional view taken along line D-D in FIG. 10, FIG. 16 is a vertical sectional view taken along line E-E in FIG. 10, FIG. 17 is a vertical sectional view taken along line F-F in FIG. 10. FIGS. 18 and 19 are partial vertical sectional views of the washing machine 1 having the water treatment unit 100 attached thereto, taken along mutually perpendicular lines.

The water treatment unit 100 has a case 101 that has an elongate, for example oval, shape as seen in a plan view and that is made of a synthetic resin. The case 101 is composed of a base 101a and a cover 101b placed over the base 101a. On the top surface of the base 101a, a partition wall 102 is formed that is elliptic in shape as seen in a plan view. On the bottom surface of the cover 101b, double walls 103 are formed, into the gap left between which is inserted the top end of the partition wall 102. With a ring-shaped sealing member 104 put between the double walls 103, the cover 101b is placed over the base 101a, and then these are tightened together with screws 105 put through the cover 101b from below it. In this way, the base 101a and the cover 101b are put together, with a space 106 left between them that is surrounded by the partition wall 102. The screws 105 are arranged at four places.

As described above, the case 101 has an elongate shape, and in a portion near one end thereof, an inflow port 107 and an outflow port 108 are provided, which are both pipe-shaped. The inflow port 107 and outflow port 108 protrude downward from the bottom surface of the base 101a perpendicularly thereto, and are arranged concentrically, with the inflow port 107 out and the outflow port 108 in. Here, "concentrically" denotes that the outflow port 108 is located inside the sectional area of the inflow port 107, and does not absolutely require that the inflow port 107 and outflow port 108 be arranged "coaxially," with the sectional centers thereof coinciding with each other, or that the inflow port 107 and outflow port 108 both have circular sectional shapes. In this embodiment, however, where a construction is adopted in which, as will be described later, the case 101 is attached to and detached from the washing machine 1 by being twisted, it is preferable, as actually practiced in this embodiment, that the inflow port 107 and outflow port 108 be arranged coaxially and in addition that the inflow port 107 and outflow port 108 both have circular sectional shapes. In a case where the case 01 is not attached by being twisted but it is put into position simply by being pressed from above, it is also possible to adopt a construction in which the inflow port 107 and outflow port 108 have the centers thereof deviated from one another or they have sectional shapes other than circular ones.

In the space 106, another partition wall 109 is formed. The partition wall 109 is composed of a partition wall segment 109a that rises from the top surface of the base 101a and a partition wall segment 109b that is hung from the bottom surface of the cover 101b. The partition wall segment 109a forms a dead-end passage 110 that is open at one end and closed at the other. The outflow port 108 is located at the closed end of this dead-end passage 110 (see FIG. 10). The inflow port 107 is open toward outside the partition wall segment 109a. Thus, the inflow port 107 and outflow port 108 are separated from each other by the partition wall segment 109a.

The partition wall segment 109b formed on the cover 101b is formed aligned with the open end of the partition wall segment 109a, and serves as an extension of the dead-end passage 110.

Inside the dead-end passage 110, two flat-shaped electrodes 113 and 114 are arranged parallel to and at a predetermined interval from each other. The electrodes 113 and 114 are made of a metal from which metal ions that exert an antimicrobial effect can be produced, examples of such metals including silver, copper, and zinc.

The electrodes 113 and 114 extend from the entrance of the dead-end passage 110 toward the outflow port 108. The water that has flowed into the space 106 through the inflow port 107 is guided along the outside of the partition wall 109 to the entrance of the dead-end passage 110. The water then enters the dead-end passage 110, and then flows along the length of the electrodes 113 and 114 toward the outflow port 108.

With water present inside the case 101, when a predetermined voltage is applied between the electrodes 113 and 114, ions of the metal of which the electrodes 113 and 114 are made are eluted from whichever of them is on the positive side. The electrodes 113 and 114 are each formed as, for example, a flat-shaped plate of silver measuring about 2 cm×5 cm in width and length and 1 mm in thickness, and are arranged at an interval of 5 mm from each other.

A slight gap is secured between the top end of the partition wall segment 109a and the bottom surface of the cover 101b. This helps complement the supply of water through the entrance of the dead-end passage 110 to the outflow port 108, which supply tends to be insufficient if that route is the only one by way of which water is supplied thereto.

On the top surface of the base 101a and on the bottom surface of the cover 101b, pillow-shaped projections 11a and 111b are formed for holding the electrodes 113 and 114. With the electrodes 113 and 114 sandwiched between the projections 111a and 111b, when the screws 105 are tightened as described earlier, the electrodes 113 and 114 are firmly held with predetermined intervals left between themselves and from them to the inner surface of the partition wall 109, the base 101a, and the cover 101b.

On the electrodes 113 and 114, in parts thereof near the entrance of the dead-end passage 110, connector blades 112a and 112b are formed. The connector blades 112a and 112b penetrate a watertight sealing member 115 and the base 101a, and protrude from the bottom surface of the base 101a to form connector portions 112. Whereas the inflow port 107 and outflow port 108 are provided in a portion of the case 101 near one end thereof, the connector portions 112 are provided in a portion of the case 101 near the opposite end thereof. The direction in which the inflow port 107 and outflow port 108 protrude is the same as the direction in which the connector portions 112 protrude.

On the base 101a, bayonet hooks 116 are formed that permits the case 101 to be bayonet-coupled to the back panel 12. The bayonet hooks 116 are arranged at two places outside the inflow port 107 so as to be point-symmetric about the inflow port 107.

On the outer surface of the inflow port 107, a ring-shaped groove 117 is formed in which to fit a seal ring, which will be described later. Near one end of the cover 101b is provided a lid 118. Below the lid 118 is formed a through hole 119 that penetrates the cover 101b and base 101a.

As shown in FIGS. 18 and 19, in the back panel 12, a water feed port 171 and a water receive port 172 are provided. The water feed port 171 and water receive port 172 are formed integrally in a single water passage forming member 170, and are exposed through an opening formed in the back panel 12. The water feed port 171 and water receive port 172 are both pipe-shaped, and are arranged concentrically with the axial lines thereof vertical.

From the water feed port 171, a water feed pipe 173 protrudes horizontally. The water feed pipe 173 runs into the water feed valve 50, and is connected, through an unillustrated hose, to a faucet of tap water. In a top portion of the inner surface of the water feed port 171, recesses 174 are formed into which the bayonet hooks 116 are inserted. Near the bottoms of the recesses 174 are formed, though unillustrated, engagement portions with which to engage the tip ends of the bayonet hooks 116.

The water receive port 172 leads to a connection pipe 175 that protrudes from the bottom surface of the water passage forming member 170. An elbow pipe 176 that leads to the water feed port 53 connects to the connection pipe 175.

In the back panel 12, recesses 177 are formed into which the connector portions 112 are inserted. Inside the recesses 177 are arranged, though unillustrated, connectors. These connectors are connected to leads that are laid with a predetermined margin so that, with the connectors taken out above the back panel 12, they can be connected to and disconnected from the connector portions 112. When the connectors are connected to the connector portions 112, a drive circuit (described later) is electrically connected to the electrodes 113 and 114.

To attach the water treatment unit 100 to the washing machine 1, first, above the back panel 12, the connector portions 112 and the connectors are connected together, and then the inflow port 107 is inserted into the water feed port 171. At this time, the bayonet hooks 116 are inserted into the recesses 174. As the case 101 is pressed from above, the inflow port 107 fits into the water feed port 171, and the outflow port 108 into the water receive port 172.

After the inflow port 107 is pressed sufficiently deep into the water feed port 171, when the case 101 is slightly twisted, the tips of the bayonet hooks 116 engage with the engagement portions in the recesses 174. Now, simply pulling the case 101 does not permit it to be pulled out. In this state, the lid 118 is opened, and a screw 178 is, through the through hole 119, screwed into the water passage forming member 170. This prevents the case 101 from rotating, and thus permits it to be firmly fixed to the washing machine 1.

The water treatment unit 100 is attached to the washing machine 1 with a seal ring 179 fitted in the ring-shaped groove 117 of the inflow port 107. When the water treatment unit 100 is fixed to the washing machine 1, the seal ring 179 keeps the inflow port 107 and the water feed port 171 watertight against each other.

To detach the water treatment unit 100, first the lid 118 is opened and the screw 178 is removed, and then the case 101 is twisted in the direction opposite to that in which it was twisted when attached. This causes the bayonet hooks 116 to disengage from the engagement portions. Now, the case 101 is pulled upward out. Then, the connectors are disconnected from the connector portions 112.

The above-described attaching and detaching of the water treatment unit 100 can be dealt with by the use of a single screw driver alone. That is, without the help of an expert, the user can replace the water treatment unit 100 easily by him or herself.

Figure 20:
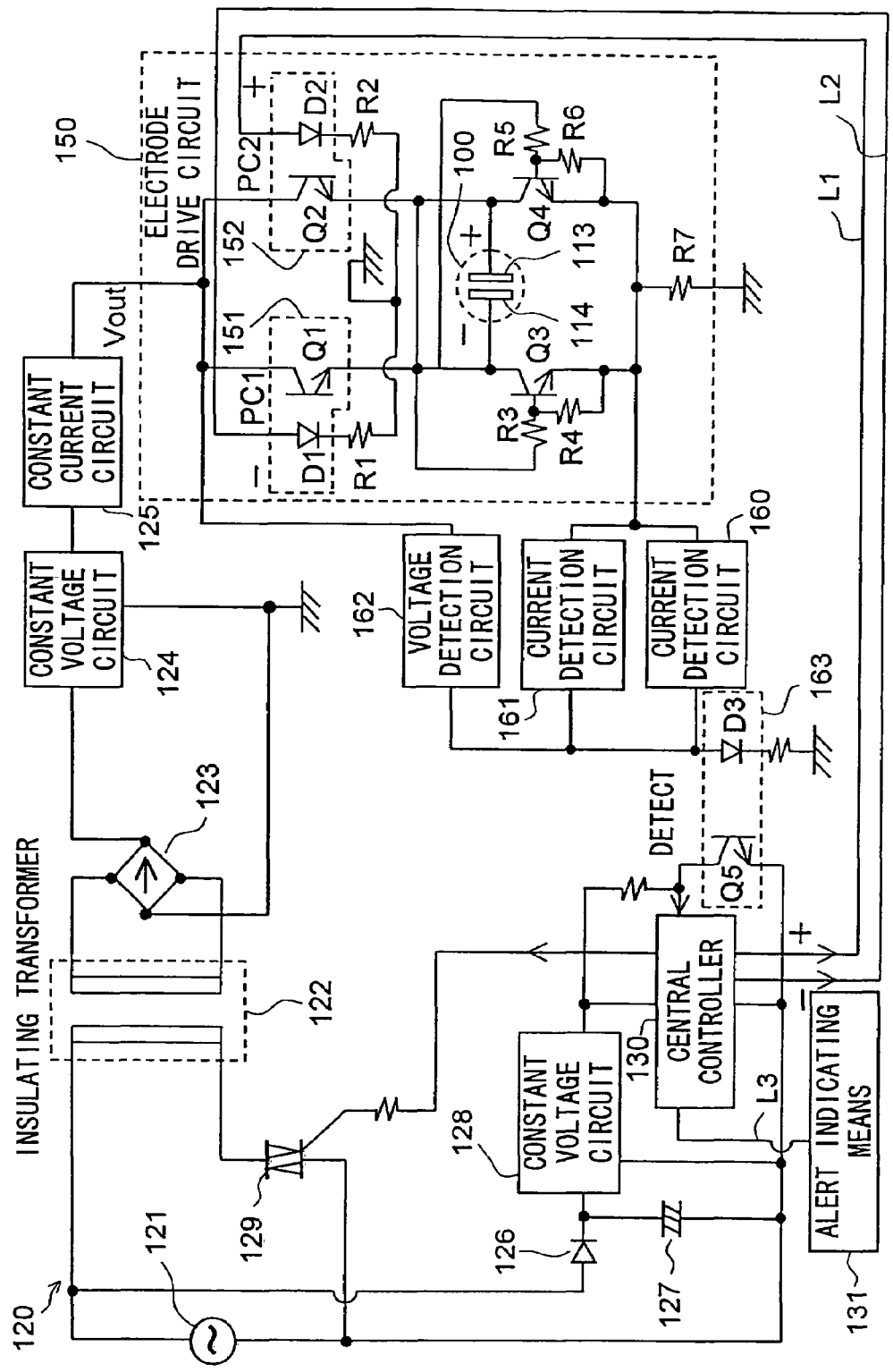
FIG. 20 is a drive circuit diagram of the water treatment unit.

FIG. 20 shows the drive circuit 120 of the water treatment unit 100. A transformer 122 is connected to commercially distributed electric power 121 to step down the voltage thereof, i.e., 100 V, to a predetermined voltage. The output voltage of the transformer 122 is rectified by a full-wave rectifier circuit 123, and is then regulated into a constant voltage by a constant voltage circuit 124. To the constant voltage circuit 124 is connected a constant current circuit 125. The constant current circuit 125 so operates that an electrode drive circuit 150, which will be described later, is always fed with a constant current irrespective of variations in the resistance across the electrode drive circuit 150.

To the commercially distributed electric power 121 is connected, in parallel with the transformer 122, a rectifying diode 126. The output voltage of the rectifying diode 126 is smoothed by a capacitor 127, is then regulated into a constant voltage by a constant voltage circuit 128, and is then fed to a central controller 130. The central controller 130 controls the starting of a triac 129 that is connected between one end of the primary coil of the transformer 122 and the commercially distributed electric power 121.

The electrode drive circuit 150 is built with NPN-type transistors Q1 to Q4, diodes D1 and D2, and resistors R1 to R7, and these are interconnected as shown in the figure. The transistor Q1 and the diode D1 together form a photocoupler 151, and the transistor Q2 and the diode D2 together form a photocoupler 152. That is, the diodes D1 and D2 are photodiodes, and the transistors Q1 and Q2 are phototransistors.

When the central controller 130 feeds a high-level voltage to a line L1 and a low-level voltage (or a zero voltage, i.e., "off") to a line L2, the diode D2 turns on, and accordingly the transistor Q2 turns on. When the transistor Q2 turns on, a current flows through the resistors R3, R4, and R7, and thus the base of the transistor Q3 is biased, causing this transistor Q3 to turn on.

On the other hand, since the diode D1 is off, the transistor Q1 is off, and accordingly the transistor Q4 also is off. In this state, a current flows from the positive-side electrode 113 to the negative-side electrode 114. Thus, within the water treatment unit 100, metal ions are eluted from the positive electrode.

When a current is passed through the water treatment unit 100 in one direction for a long time, whereas the electrode 113 on the positive side in FIG. 20 wears off, impurities present in water deposit in the form of scale on the electrode 114 on the negative side. This degrades the performance of the water treatment unit 100. To prevent this, the electrode drive circuit 150 is so configured that it can be operated also in a forcible electrode cleaning mode.

To reverse the polarities of the electrodes, the central controller 130 switches its control so as to reverse the voltages fed to the lines L1 and L2 so that a current flows in the opposite direction between the electrodes 113 and 114. Now, the transistors Q1 and Q4 are on, and the transistors Q2 and Q3 are off. The microcomputer 130 incorporates a counter function, and performs this switching every time a predetermined count is reached.

If, as a result of a variation in the resistance across the electrode drive circuit 150, in particular in the resistances of the electrodes 113 and 114, the current flowing between the electrodes decreases or a similar situation occurs, the constant current circuit 125 raises the output voltage thereof to prevent a decrease in the current. However, as the accumulated use time increases, the water treatment unit 100 ultimately reaches the end of the useful life thereof. When this happens, it is no longer possible to prevent a decrease in the current even by switching to the forcible electrode cleaning mode, or by raising the output voltage of the constant current circuit 125.

To cope with this, in the circuit under discussion, the current flowing between the electrodes 113 and 114 of the water treatment unit 100 is monitored by monitoring the voltage across the resistor R7, and, when this current becomes equal to the minimum permissible current level, it is detected by a current detection circuit 160. The information that the minimum permissible current level has been detected is fed from a photodiode D3 included in a photocoupler 163 via a phototransistor Q5 included in the same photocoupler 163 to the central controller 130. The central controller 130 then drives, via a line L3, an alert indicating means 131 to make it give out a predetermined warning indication. The alert indicating means 131 is provided in the operation/display unit 81.

Moreover, to cope with a fault such as a short circuit within the electrode drive circuit 150, there is provided a current detection circuit 161 for detecting that the current has become higher than the maximum permissible current level. On the basis of the output of this current detection circuit 161, the central controller 130 drives the alert indicating means 131. Likewise, when the output voltage of the constant current circuit 125 becomes lower than a predetermined minimum level, a voltage detection circuit 162 detects it, and the microcomputer 130 drives the alert indicating means 131.

How the drive circuit 120 drives the water treatment unit 100 mounted on the washing machine 1 is as follows.

Figure 21:
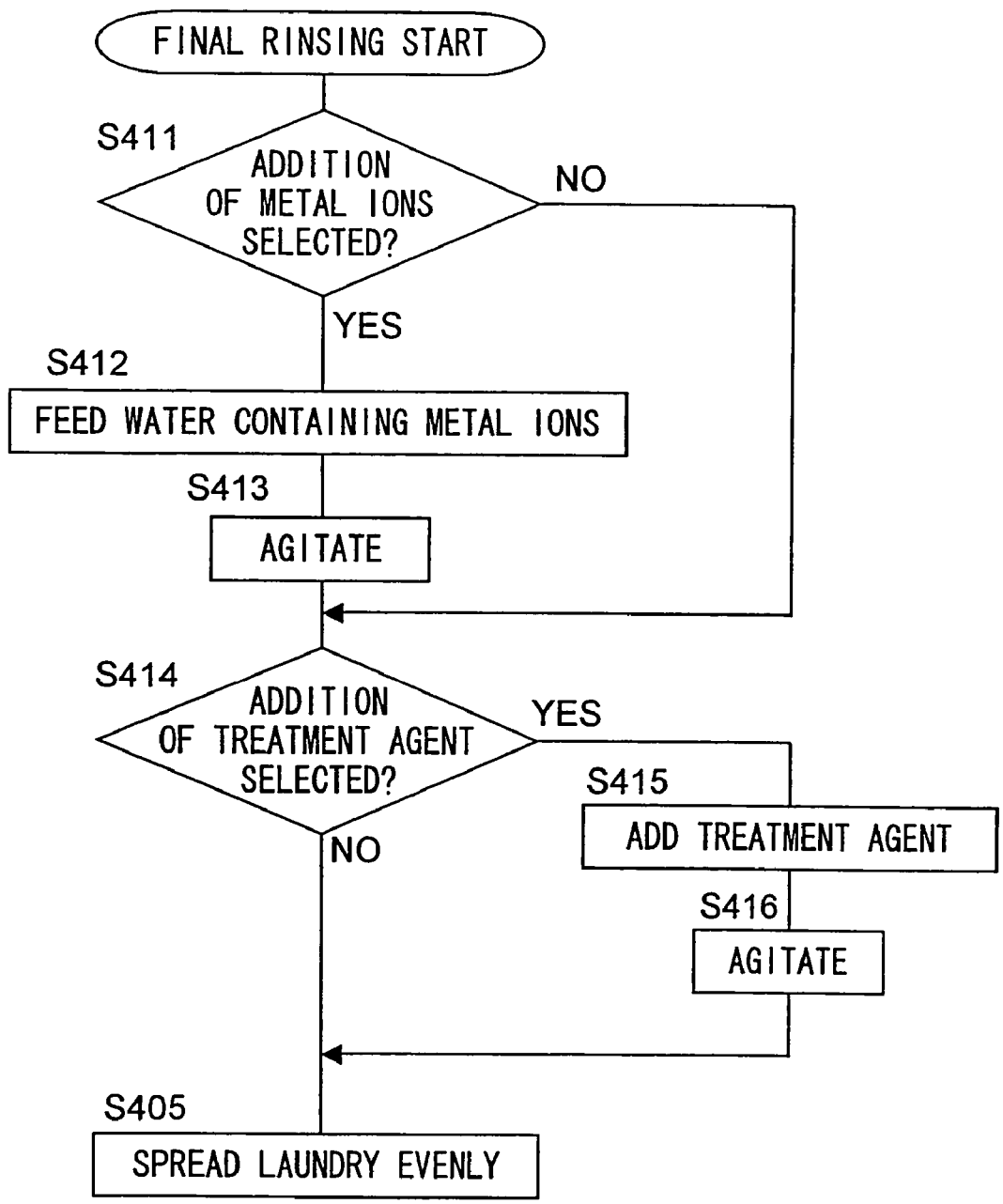
FIG. 21 is a flow chart showing the sequence for adding metal ions.

FIG. 21 is a flow chart showing the sequence for adding metal ions. The sequence shown in FIG. 21 is executed in the stage of final rinsing performed in step S405 (main water current) in the operation flow shown in FIG. 5. Specifically, when the final rinsing is started, then, in step S411, whether or not addition of metal ions is selected is checked. If "addition of metal ions" is selected through selection operation performed on the operation/display unit 81, then the flow proceeds to step S412; if not, the operation flow proceeds to step S414.

In step S412, the main feed valve 50a is opened so that water is fed to the water treatment unit 100 at a predetermined flow rate. Simultaneously, the drive circuit 120 apples a voltage between the electrodes 113 and 114 so that ions of the metal of which they are made are eluted into the water. The current that flows between the electrodes is a direct current. The water containing the metal ions is fed through the water feed port 53 into the washing tub 30.

When a predetermined amount of water containing metal ions has been added and the concentration of the metal ions in the rinsing water is judged to have reached a predetermined level, the main feed valve 50a is closed, and the application of the voltage to the electrodes 113 and 114 is stopped.

Next, in step S413, the rinsing water is agitated to promote contact between the laundry and the metal ions. The agitation is continued for a predetermined period of time.

Next, in step S414, whether or not addition of a treatment agent is selected is checked. This checking may be performed earlier; for example, it may be performed at the same time as the checking, in step S411, of whether or not addition of metal ions is selected. If "addition of a treatment agent" is selected through selection operation performed on the operation/display unit 81, then the flow proceeds to step S415; if not, the operation flow proceeds to step S405. In step S405, the pulsator 33 is rotated alternately in the forward and reverse directions to make the laundry loose so that the laundry is spread evenly inside the washing tub 30 in preparation for spin-drying rotation.

In step S415, the sub feed valve 50b is opened so that water is passed through the treatment agent compartment 55 of the water feed port 53. If a treatment agent has been put in the treatment agent compartment 55, it is, along with the water, fed into the washing tub 30 through the siphon 57. It is not before the water level inside the treatment agent compartment 55 reaches a predetermined height that the principle of siphon works. This makes it possible to keep a liquid treatment agent in the treatment agent compartment 55 until the time comes when water is poured into the treatment agent compartment 55.

When a predetermined amount of water (sufficient to cause the siphon 57 to work as a siphon, or more) has been poured into the treatment agent compartment 55, the sub feed valve 50b is closed. Incidentally, this feeding of water, i.e., the operation performed to add the treatment agent, is performed automatically irrespective of whether or not a treatment agent is put in the treatment agent compartment 55 so long as adding of a treatment agent is selected.

Next, in step S416, the rinsing water is agitated to promote contact between the laundry and the treatment agent. The agitation is continued for a predetermined period of time, and then the operation flow proceeds to step S405.

According to the sequence described above, it is a predetermined period of time after the metal ions are added to the rinsing water that the treatment agent is added to the rinsing water. If the metal ions and the treatment agent (softening agent) are simultaneously added to the rinsing water, the metal ions react with the treatment agent, resulting in a diminished antimicrobial effect. By contrast, according to the sequence described above, it is after the metal ions have sufficiently attached to the laundry that the treatment agent is added. This prevents the metal ions from reacting with the treatment agent, and thus helps leave the antimicrobial effect exerted by the metal ions on the laundry.

It is preferable that the electrodes 113 and 114 be made of silver, copper, or silver-copper alloy. Silver ions eluted from a silver electrode exert an excellent antimicrobial effect, and copper ions eluted from a copper electrode exert an excellent antifungal effect. Silver-copper alloy permits silver and copper ions to be eluted simultaneously therefrom.

Silver ions are positive ions. In water, laundry is negatively charged, and therefore silver ions are electrically attracted by laundry. Once silver ions attach to laundry, they are electrically neutralized. This makes the silver ions less likely to react with the chloride ions (negative ions) contained in a treatment agent (softening agent). Here, it takes time for the silver ions to attach to the laundry, and this makes it necessary to wait for a certain period of time before adding the treatment agent. Accordingly, after the silver ions are added, agitation is performed for 10 minutes. After the addition of the treatment agent, it suffices to perform agitation for about three minutes.

The metal ions are fed into the washing tub 30 through the main feed pipe 52a and then through the detergent compartment 54. The treatment agent is fed into the washing tub 30 through the treatment agent compartment 55. Thus, the route by way of which the metal ions are added to the rinsing water is separate from the route by way of which the treatment agent is added to the rinsing water. This prevents the metal ions from passing through the route through which the treatment agent is added to the rinsing water, thus prevents them from making contact with the treatment agent remaining on the route, and thus prevents them from forming compounds therewith and losing their antimicrobial effect.

Moreover, according to the sequence described above, the addition of the metal ions and the addition of the treatment agent are each accompanied by the agitation of the rinsing water. This ensures that the metal ions and the treatment agent attach to all parts of the laundry.

When the water treatment unit 100 is driven, the constant current circuit 125 provided in the drive circuit 120 controls the voltage in such a way as to keep constant the current that flows between the electrodes 113 and 114. This keeps constant the amount of metal ions eluted per unit time. So long as the amount of metal ions eluted per unit time is kept constant, it is possible to control the concentration of metal ions inside the washing tub 30 by controlling the flow rate at which water is passed through the water treatment unit 100 and the duration for which ions are eluted. In this way, it is possible to obtain a desired concentration of metal ions easily.

As the electrodes 113 and 114 wear off, the voltage needed to keep the current constant becomes higher. When the voltage exceeds a predetermined threshold level, it is judged that the electrodes 113 and 114 have worn to their limit, and the alert indicating means 131 is made to give out an indication to that effect. Moreover, a message prompting replacement of the water treatment unit 100 is indicated. In response, the user replaces the water treatment unit 100.

The water treatment unit 100 can be combined not only with a full-automatic washing machine, like the washing machine 1 used in this embodiment, but also with any other type of washing machine, of which examples include those having horizontal drums (of the tumbler type), those having slanted drums, those which function also as dryers, and those with two separated tubs.

It is to be understood that the present invention may be carried out in any other manner than specifically described above as an embodiment, and many modifications and variations are possible within the scope of the present invention. For example, the water treatment unit may be used not in a "horizontal posture" as in the embodiment described above but also in a "vertical posture," i.e., with the length direction of the case aligned vertically and the inflow port and outflow port protruding horizontally, or in a "sideways posture," i.e., with the length direction of the case aligned horizontally and the inflow port and outflow port protruding horizontally. Water may be treated not by elution of metal ions but by production of electrolyzed water or in any other manner.

INDUSTRIAL APPLICABILITY

The present invention is applicable not only to laundry washing machines but to appliances that use water in general, such as dish washing machines and humidifiers.

The invention claimed is:

1. A washing machine comprising a detachable water treatment unit that applies a voltage between electrodes and thereby elutes therefrom metal ions that exert an antimicrobial effect, wherein, in a water feed route for feeding water to a washing tub, there are provided a water feed port and a water receive port, which are arranged in a top surface of the washing machine, wherein the water treatment unit has, in a portion near one end of a bottom surface of an elongate case, an inflow port to be connected to the water feed port and an outflow port to be connected to the water receive port, and has, in a portion near the other end of the bottom surface of the case, connector portions for energizing the electrodes, any of the inflow port, the outflow port, and the connector portions protruding perpendicularly downward, and wherein the water treatment unit is fitted to the top surface of the washing machine by bayonet coupling.

2. The washing machine of claim 1,
wherein the water feed port and the water receive port are provided in a back panel on the top surface of the washing machine.

3. The washing machine according to claim 2,
wherein both the inflow port and the outflow port have circular sectional shapes and are arranged coaxially.

4. The washing machine of claim 3,
wherein, after fitted to the washing machine by bayonet coupling, the water treatment unit is fixed to the washing machine by being prevented from rotating.

5. The washing machine of claim 3,
wherein the water treatment unit has the electrodes extending from near the connector portions toward the outflow port, and has, inside the case, a partition wall formed for guiding water that has flowed in through the inflow port toward parts of the electrodes near the connector portions.

6. The washing machine of claim 5,
wherein the partition wall forms a dead-end passage that is open at one end and closed at the other, wherein the outflow port is located at the closed end of the dead-end passage, wherein the inflow port is open toward outside the partition wall, wherein, inside the dead-end passage, the electrodes are arranged parallel to and at a predetermined interval from each other, and wherein the water that has flowed in through the inflow port is guided along the outside of the partition wall to an entrance of the dead-end passage, then enters the dead-end passage, and then flows along the length of the electrodes toward the outflow port.

7. The washing machine of claim 2,
wherein, in the back panel, recesses are formed into which the connector portions are inserted, and wherein the connectors arranged in the recesses are connected to the connector portions.

8. The washing machine according to claim 7,
wherein both the inflow port and the outflow port have circular sectional shapes and are arranged coaxially.

9. The washing machine of claim 8,
wherein, after fitted to the washing machine by bayonet coupling, the water treatment unit is fixed to the washing machine by being prevented from rotating.

10. The washing machine of claim 8,
wherein the water treatment unit has the electrodes extending from near the connector portions toward the outflow port, and has, inside the case, a partition wall formed for guiding water that has flowed in through the inflow port toward parts of the electrodes near the connector portions.

11. The washing machine of claim 10,
wherein the partition wall forms a dead-end passage that is open at one end and closed at the other, wherein the outflow port is located at the closed end of the dead-end passage, wherein the inflow port is open toward outside the partition wall, wherein, inside the dead-end passage, the electrodes are arranged parallel to and at a predetermined interval from each other, and wherein the water that has flowed in through the inflow port is guided along the outside of the partition wall to an entrance of the dead-end passage, then enters the dead-end passage, and then flows along the length of the electrodes toward the outflow port.

12. The washing machine of claim 7,
wherein the connectors are connected to leads that are laid with a predetermined margin.

13. The washing machine according to claim 12,
wherein both the inflow port and the outflow port have circular sectional shapes and are arranged coaxially.

14. The washing machine of claim 13,
wherein, after fitted to the washing machine by bayonet coupling, the water treatment unit is fixed to the washing machine by being prevented from rotating.

15. The washing machine of claim 13,
wherein the water treatment unit has the electrodes extending from near the connector portions toward the outflow port, and has, inside the case, a partition wall formed for guiding water that has flowed in through the inflow port toward parts of the electrodes near the connector portions.

16. The washing machine of claim 15,
wherein the partition wall forms a dead-end passage that is open at one end and closed at the other, wherein the outflow port is located at the closed end of the dead-end passage, wherein the inflow port is open toward outside the partition wall, wherein, inside the dead-end passage, the electrodes are arranged parallel to and at a predetermined interval from each other, and wherein the water that has flowed in through the inflow port is guided along the outside of the partition wall to an entrance of the dead-end passage, then enters the dead-end passage, and then flows along the length of the electrodes toward the outflow port.

17. The washing machine according to claim 1,
wherein both the inflow port and the outflow port have circular sectional shapes and are arranged coaxially.

18. The washing machine of claim 17,
wherein, after fitted to the washing machine by bayonet coupling, the water treatment unit is fixed to the washing machine by being prevented from rotating.

19. The washing machine of claim 17,
wherein the water treatment unit has the electrodes extending from near the connector portions toward the outflow port, and has, inside the case, a partition wall formed for guiding water that has flowed in through the inflow port toward parts of the electrodes near the connector portions.

20. The washing machine of claim 19,
wherein the partition wall forms a dead-end passage that is open at one end and closed at the other, wherein the outflow port is located at the closed end of the dead-end passage, wherein the inflow port is open toward outside the partition wall, wherein, inside the dead-end passage, the electrodes are arranged parallel to and at a predetermined interval from each other, and wherein the water that has flowed in through the inflow port is guided along the outside of the partition wall to an entrance of the dead-end passage, then enters the dead-end passage, and then flows along the length of the electrodes toward the outflow port.

* * * * *